United States Patent
Castro Castro et al.

(10) Patent No.: US 9,949,191 B2
(45) Date of Patent: Apr. 17, 2018

(54) METHODS, DEVICES AND COMPUTER PROGRAMS FOR PROVIDING A SERVICE OR SERVICE COMPONENT REQUIRING A SPECIFIC PACKET-FORWARDING TREATMENT

(71) Applicant: Telefonaktiebolaget LM Ericsson (publ), Stockholm (SE)

(72) Inventors: Fabian Castro Castro, Arillo/Oleiros/A Coruña (ES); Susana Fernandez Alonso, Madrid (ES); Daniel Nilsson, Älvängen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 110 days.

(21) Appl. No.: 14/917,199

(22) PCT Filed: Sep. 27, 2013

(86) PCT No.: PCT/EP2013/070229
§ 371 (c)(1),
(2) Date: Mar. 7, 2016

(87) PCT Pub. No.: WO2015/043662
PCT Pub. Date: Apr. 2, 2015

(65) Prior Publication Data
US 2016/0212668 A1 Jul. 21, 2016

(51) Int. Cl.
*H04W 4/14* (2009.01)
*H04W 36/14* (2009.01)
(Continued)

(52) U.S. Cl.
CPC ......... *H04W 36/14* (2013.01); *H04L 41/0663* (2013.01); *H04L 41/0893* (2013.01);
(Continued)

(58) Field of Classification Search
CPC .. H04W 36/14; H04W 36/26; H04L 41/0663; H04L 41/5054; H04L 41/0893; H04L 47/80; H04L 47/20; H04L 47/805
See application file for complete search history.

(56) References Cited

U.S. PATENT DOCUMENTS 9,608,830 B2 * 3/2017 Perez Martinez .. H04L 12/1407
9,749,904 B1 * 8/2017 Zhang ............... H04W 36/0022
(Continued)

FOREIGN PATENT DOCUMENTS

| EP | 2592852 | * | 5/2013 | ............... H04W 8/26 |
| WO | 2013044959 A1 | | 4/2013 | |

OTHER PUBLICATIONS

3GPP TS 29.213 V11.6.0 (Mar. 2013) 3rd Generation Partnership Project; Technical Specification Group Core Network and Terminals; Policy and Charging Control signalling flows and Quality of Service (QoS) parameter mapping (Releas 11) Mar. 15, 2013 consisting of 191-pages.
(Continued)

*Primary Examiner* — Jay P Patel
(74) *Attorney, Agent, or Firm* — Christopher & Weisberg, P.A.

(57) ABSTRACT

In a method for providing, for a terminal device, a service or service component requiring a first packet-forwarding treatment, a network node hosting a policy decision function determines that a dedicated bearer for carrying the traffic associated with the service or service component requiring the first packet-forwarding treatment cannot be used. This occurs when the service is initiated or, in the alternative, for an ongoing service. The service or service component is then initiated or, in the alternative, maintained, using a fallback bearer allowing the traffic associated with the service or service component to be carried with a second packet-forwarding treatment differing from the first one. The inven-
(Continued)

tion also relates to a method carried out, in such a context, by a network node hosting an application function, and to computer programs, computer program products and storage mediums for carrying out such methods.

32 Claims, 15 Drawing Sheets

(51) Int. Cl.
*H04L 12/813* (2013.01)
*H04L 12/927* (2013.01)
*H04W 36/26* (2009.01)
*H04L 12/24* (2006.01)

(52) U.S. Cl.
CPC .......... *H04L 41/5054* (2013.01); *H04L 47/20* (2013.01); *H04L 47/80* (2013.01); *H04L 47/805* (2013.01); *H04W 36/26* (2013.01)

(56) References Cited

U.S. PATENT DOCUMENTS

| | | | | |
|---|---|---|---|---|
| 2009/0129342 A1* | 5/2009 | Hwang | ............. | H04W 36/0022 370/331 |
| 2010/0172347 A1* | 7/2010 | Zisimopoulos | ... | H04W 36/0022 370/352 |
| 2012/0134264 A1* | 5/2012 | Ludwig | ................... | B60R 19/04 370/230 |
| 2012/0275300 A1* | 11/2012 | Munoz de la Torre Alonso | ............... | H04L 41/0681 370/229 |
| 2013/0051326 A1* | 2/2013 | Jeyatharan | ............ | H04L 47/245 370/328 |
| 2013/0163559 A1* | 6/2013 | Wang | .................. | H04W 76/027 370/331 |
| 2013/0301416 A1* | 11/2013 | Racz | ................. | H04W 28/0268 370/235 |
| 2013/0322365 A1* | 12/2013 | Garcia Martin | .... | H04L 41/0893 370/329 |
| 2014/0051443 A1* | 2/2014 | Diachina | ........... | H04W 36/0022 455/436 |
| 2014/0068064 A1* | 3/2014 | Anchan | ................. | H04W 4/001 709/224 |
| 2014/0369343 A1* | 12/2014 | Macalet | .................. | H04L 65/80 370/352 |
| 2015/0319058 A1* | 11/2015 | Molinero Fernandez | .......... | H04L 41/0613 370/329 |
| 2015/0327032 A1* | 11/2015 | Hedman | ............. | H04W 76/046 370/329 |
| 2015/0350343 A1* | 12/2015 | Ludwig | ............... | H04L 61/1511 709/226 |
| 2017/0150547 A1* | 5/2017 | Hedman | ............. | H04W 76/045 |

OTHER PUBLICATIONS

3GPP TS 23.203 V12.0.0 (Mar. 2013) 3rd Generation Partnership Project; Technical Specification Group Services and System Aspects; Policy and charging control architecture (Release 12) Mar. 7, 2013 consisting of 183-pages.

3GPP TS 29.212 V12.0.0 (Mar. 2013) 3rd Generation Partnership Project; Technical Specification Group Core Network and Terminals; Policy and Charging Control (PCC); Reference points (Release 12) Mar. 25, 2013 consisting of 198-pages.

3GPP TS 29.214 V11.8.0 (Mar. 2013) 3rd Generation Partnership Project; Technical Specification Group Core Network and Terminals; Policy and Charging Control over Rx reference point (Release 11) Mar. 2013 consisting of 54-pages.

International Seach Report and Written Opinion dated Jun. 3, 2014 for International Application Serial No. PCT/EP2013/070229, International Filing Date—Sep. 27, 2013 consisting of 10-pages.

* cited by examiner

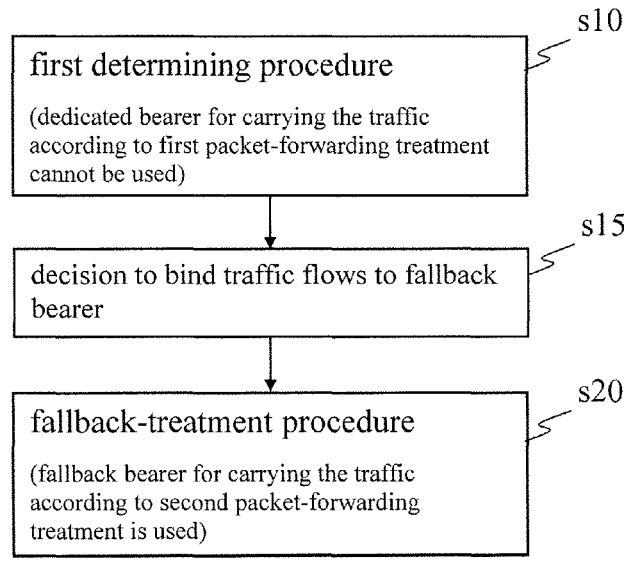
Fig. 4
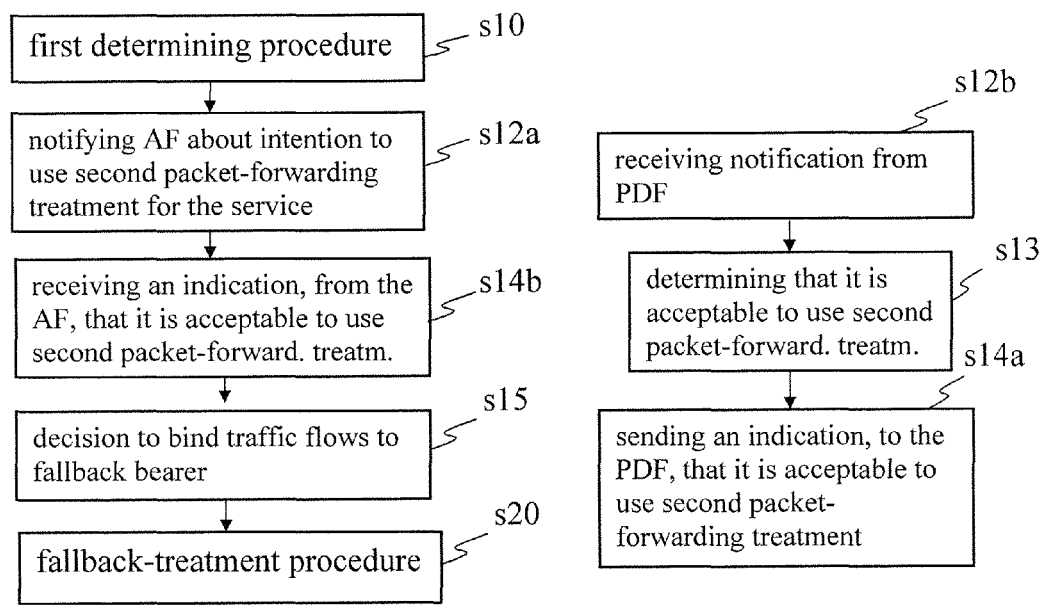
Fig. 5a
Fig. 5b

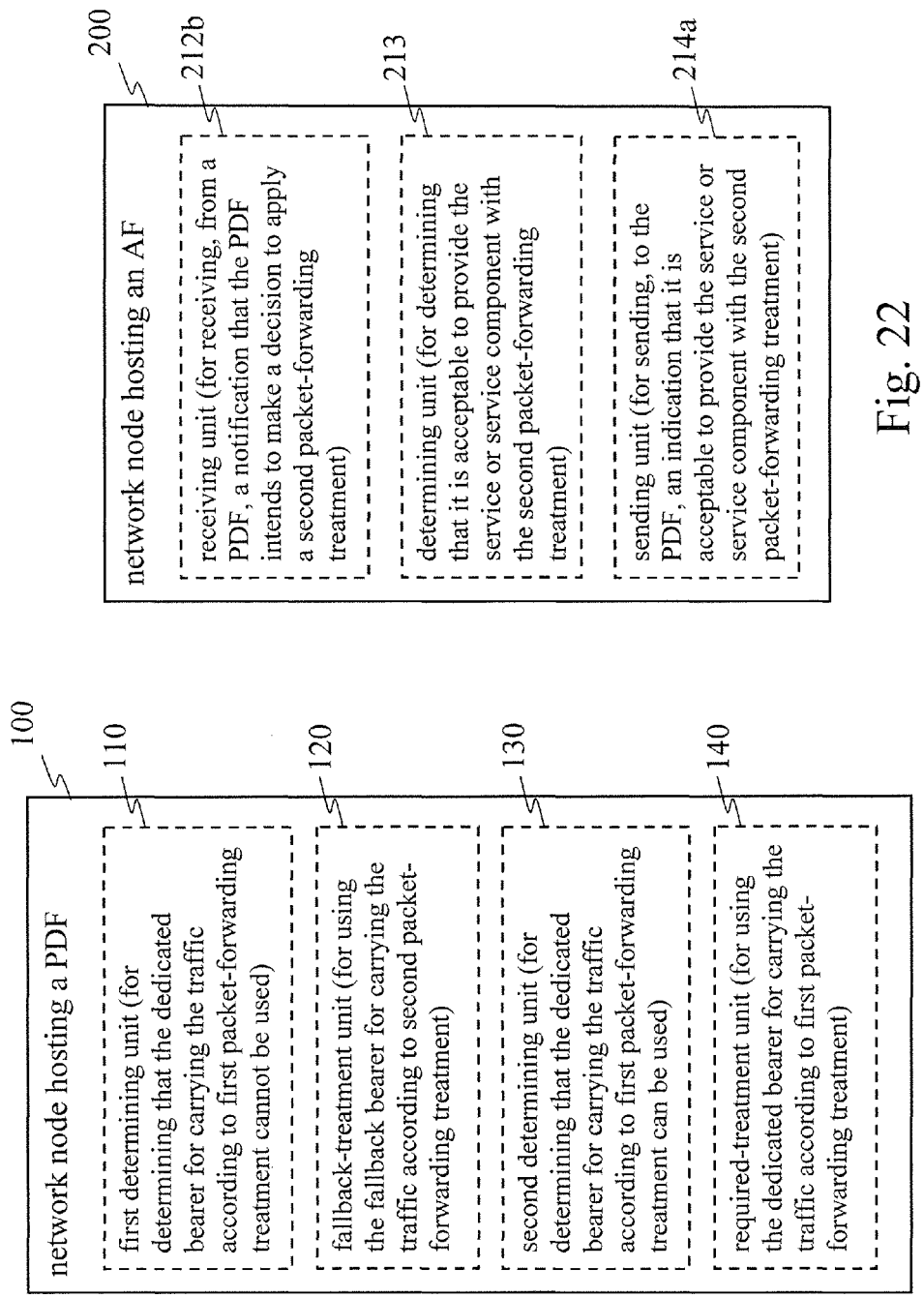

METHODS, DEVICES AND COMPUTER PROGRAMS FOR PROVIDING A SERVICE OR SERVICE COMPONENT REQUIRING A SPECIFIC PACKET-FORWARDING TREATMENT

TECHNICAL FIELD

The present invention relates to methods for providing, for a terminal device in a telecommunication network, a service or service component requiring a specific packet-forwarding treatment, such as a specific quality of service (QoS). The invention also relates to devices for participating in such methods, and to computer programs therefor.

BACKGROUND

In a telecommunication network, providing a QoS to packets associated with a particular service, or with a component of a service, involves subjecting the flow of packets to a common packet-forwarding treatment. In this context, a bearer is defined as an aggregate of one or more flows, such as for example Internet Protocol (IP) flows, relating to one or more services or service components. A bearer carries packets subjected to the same packet-forwarding treatment. The provision of a desired or contracted QoS is enabled by the bearer, both at the user plane and control plane level. If two sets of packets require different packet-forwarding treatments, more than one bearer is required. The binding of uplink flows to a bearer is typically performed by the terminal device, such as for example a user equipment (UE). The binding of downlink flows to a bearer is typically performed by a network node, such as for example a packet data network (PDN) gateway (PDN-GW).

The initial connection, or initial attachment, of a terminal device to a network usually involves the provision of a default bearer established based on subscription data. For some type of accesses, the default bearer is always on. A decision may be taken by the network, either at the time of the initial attachment or later, to establish a dedicated bearer to carry traffic requiring a specific packet-forwarding treatment. The default bearer is used to carry all the traffic which is not carried by a dedicated bearer.

It is desirable for network operators to be able to reliably provide services and service components to users, while taking into account the potential need to subject the traffic associated with a service or a service component to a specific packet-forwarding treatment, such as for example a specific QoS.

SUMMARY

To meet or at least partially meet the above-mentioned goals, methods and network nodes according to the invention are defined in the independent claims. Particular embodiments are defined in the dependent claims.

In one embodiment, a method is carried out by a network node hosting a policy decision function (PDF), such as for example a policy and charging rules function (PCRF). The purpose of the method is to participate in providing, for a terminal device in a telecommunication network, a service or service component requiring a specific packet-forwarding treatment, hereinafter referred to as "first packet-forwarding treatment". The method comprises a so-called first determining procedure and a so-called fallback-treatment procedure. The first determining procedure comprises, when the provision of the service or service component is sought to be initiated, or, in an alternative, when the service or service component is already being provided, determining that a dedicated bearer for carrying the traffic associated with the service or service component requiring the first packet-forwarding treatment cannot be used. The fallback-treatment procedure then comprises participating in initiating the provision of the service or service component, or, in the alternative, participating in carrying on the provision of the service or service component, using a bearer, hereinafter referred to as "fallback bearer", allowing the traffic associated with the service or service component to be carried with another packet-forwarding treatment, hereinafter referred to as "second packet-forwarding treatment". The first packet-forwarding treatment and the second packet-forwarding treatment are different.

This enables to avoid rejecting a service sought to be initiated or a component of a service sought to be initiated, and, in the alternative, this enables to avoid interrupting an on-going service or a component thereof. Indeed, in a situation where a service or service component would normally require the use of a dedicated bearer providing the first packet-forwarding treatment, and where, for some reasons, said dedicated bearer cannot be used at one point in time, the service or service component is nevertheless initiated, or, in the alternative, maintained, using a fallback bearer providing another packet-forwarding treatment, i.e., the second packet-forwarding treatment.

In a sub-embodiment of the above-described embodiment, the use of the fallback bearer is temporary. Namely, as soon as it is determined that the dedicated bearer for providing the required first packet-forwarding treatment can be used or, in the alternative, can be used again, said dedicated bearer is used.

In one embodiment, a method is carried out by a network node hosting an application function (AF). The purpose of the method of this embodiment is also to participate in providing, for a terminal device in a telecommunication network, a service or service component requiring a specific packet-forwarding treatment, i.e. a first packet-forwarding treatment. The method comprises receiving, from a network node hosting a PDF, a notification that said network node intends to make a decision to apply, to the traffic associated with the service or service component, another packet-forwarding treatment, i.e. a second packet-forwarding treatment. The first packet-forwarding treatment and the second packet-forwarding treatment are different. The network node hosting the AF then determines that it is acceptable to provide the service or service component with, i.e. subjected to, the second packet-forwarding treatment. The network node hosting the AF then sends, to the network node hosting the PDF, an indication that it is acceptable to provide the service or service component with, i.e. subjected to, the second packet-forwarding treatment.

In one embodiment, a network node hosting a PDF is provided. The network node participates in providing, for a terminal device in a telecommunication network, a service or service component requiring a specific packet-forwarding treatment, i.e., a first packet-forwarding treatment. The network node comprises a so-called first determining unit and a so-called fallback-treatment unit. The first determining unit is configured for, when the provision of the service or service component is sought to be initiated, or, in an alternative, when the service or service component is already being provided, determining that a dedicated bearer for carrying the traffic associated with the service or service component requiring the first packet-forwarding treatment cannot be used. The fallback-treatment unit is configured for then participating in initiating the provision of the service or service component, or, in the alternative, participating in carrying on, i.e. maintaining, the provision of the service or service component, using a bearer, hereinafter referred to as "fallback bearer", allowing the traffic associated with the service or service component to be carried with another packet-forwarding treatment, i.e., a second packet-forwarding treatment. The first packet-forwarding treatment and the second packet-forwarding treatment are different.

In one embodiment, a network node hosting an AF is provided. The network node participates in providing, for a terminal device in a telecommunication network, a service or service component requiring a specific packet-forwarding treatment, i.e., a first packet-forwarding treatment. The network node comprises a so-called receiving unit, a so-called determining unit, and a so-called sending unit. The receiving unit is configured for receiving, from a network node hosting a PDF, a notification that said network node intends to make a decision to apply, to the traffic associated with the service or service component, a second packet-forwarding treatment being different from the first packet-forwarding treatment. The determining unit is configured for determining that it is acceptable to provide the service or service component with the second packet-forwarding treatment. The sending unit is configured for then sending, to the network node hosting the PDF, an indication that it is acceptable to provide the service or service component with, i.e. subjected to, the second packet-forwarding treatment.

The invention also relates to a system of network nodes as described above, implemented for example using a set of programmed computers.

The invention further relates to computer programs, computer program products and storage mediums comprising computer-readable instructions configured, when executed on a network node, to cause the network node to carry out a method according to any one of the above-described embodiments, or to implement the functions of a network node according to any one of the above-described embodiments. The invention yet further relates to terminal devices configured for being used in the context of the above-described embodiments and to methods for operating such terminal devices.

BRIEF DESCRIPTION OF THE DRAWINGS

Embodiments of the present invention shall now be described, in conjunction with the appended figures, in which:

FIG. 4 is a flowchart of a method in one embodiment of the invention, wherein a fallback-treatment procedure is carried out following a decision to bind flows of traffic associated with a service or service component to a fallback bearer;

FIG. 5a is a flowchart of a method in one embodiment of the invention, involving a network node hosting a PDF notifying a network node hosting an AF prior to executing a fallback-treatment procedure;

FIG. 5b is a flowchart of a method in one embodiment of the invention, involving a network node hosting an AF receiving a notification from a network node hosting a PDF before a fallback-treatment procedure can be executed;

FIGS. 20 and 21 schematically illustrate network nodes hosting a PDF in two embodiments of the invention; and FIG. 22 schematically illustrates a network node hosting an AF in one embodiment of the invention.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims. A list of abbreviations and their meaning is provided at the end of the detailed description.

Figure 1:
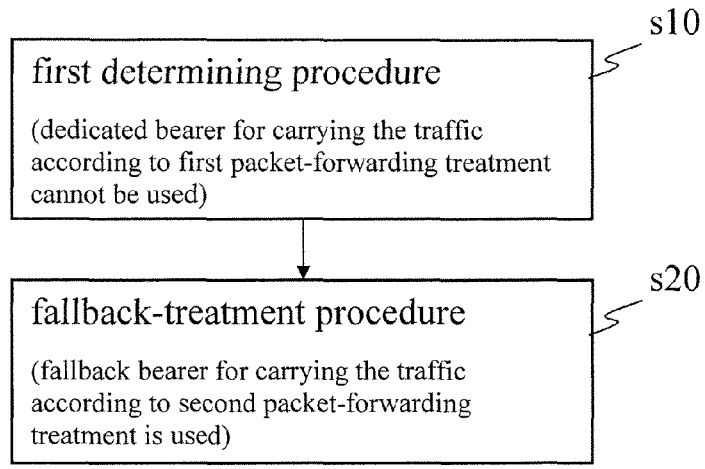
FIG. 1 is a flowchart of a method in one embodiment of the invention, the method being carried out by a network node hosting a policy decision function (PDF)

FIG. 1 is a flowchart of a method in one embodiment of the invention. The method is carried out by a network node hosting a policy decision function (PDF), such as for example a PCRF. The purpose of the method is to participate in providing, for the benefit of a terminal device in a telecommunication network, a service or service component requiring a specific packet-forwarding treatment. This specific packet-forwarding treatment is herewith called "first packet-forwarding treatment". The method comprises a so-called "first determining procedure" s10 and a so-called "fallback-treatment procedure" s20.

Figure 2A:
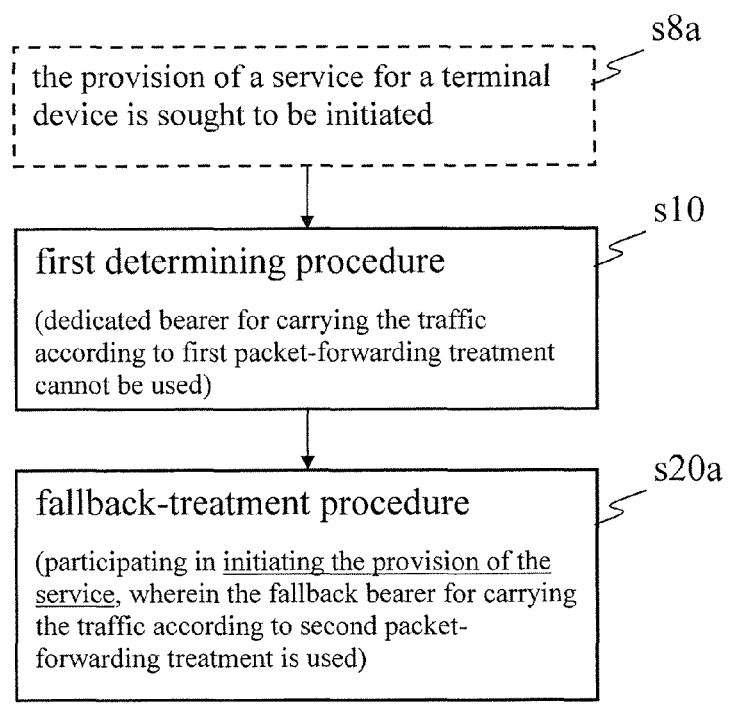
FIGS. 2a and 2b are flowcharts of methods in two embodiments of the invention, wherein, in FIG. 2a, the method is carried out when a service or service component is sought to be initiated and, in FIG. 2b, the method is carried out for an on-going service.
Figure 2B:
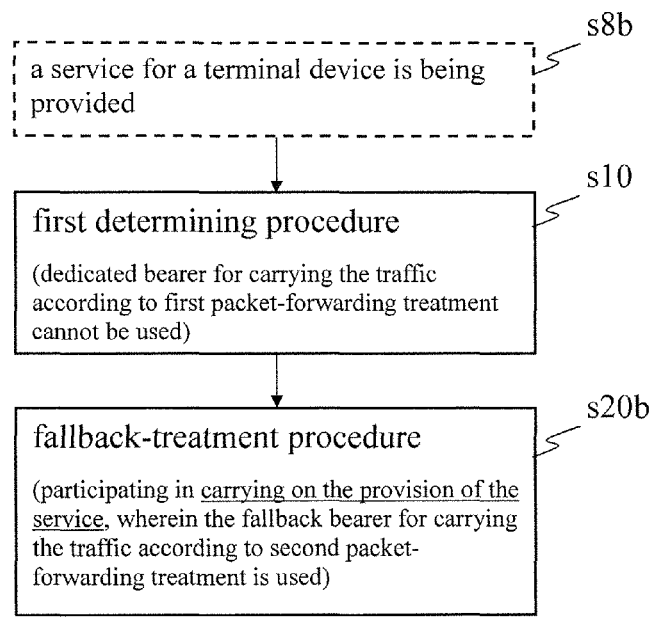

The first determining procedure s10 is carried out when the provision of the service or service component is sought to be initiated s8a (as illustrated in FIG. 2a), or, in an alternative, when the service or service component is already being provided s8b, i.e. for an on-going service or service component (as illustrated in FIG. 2b). The first determining procedure s10 comprises determining that a dedicated bearer for carrying the traffic associated with the service or service component requiring the first packet-forwarding treatment cannot be used. In such a case, instead of interrupting the establishment (i.e., the initiation) of the service or service component or, in the alternative, instead of interrupting the on-going service or service component, the fallback-treatment procedure s20 is executed. The fallback-treatment procedure s20 comprises participating in initiating the provision of the service or service component (as illustrated in FIG. 2a), or, in the alternative, participating in carrying on the provision of the service or service component (as illustrated in FIG. 2b), using a bearer, here called "fallback bearer". The fallback bearer allows the traffic associated with the service or service component to be carried with a second packet-forwarding treatment, rather than with a first packet-forwarding treatment. The first packet-forwarding treatment and the second packet-forwarding treatment are different.

In such a manner, the service or service component can be initiated or can be maintained, though with a different packet-forwarding treatment than normally required. In the first determining procedure s10, the network node hosting the PDF determines whether a dedicated bearer for providing the required, first packet-forwarding treatment can be used. If a dedicated bearer for providing the required first packet-forwarding treatment cannot be used, the execution of the fallback-treatment procedure s20 is triggered.

A policy decision function (PDF) is an element in a policy framework. The PDF makes determinations as to which rules are to be enforced in the network. Network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

Policy and charging control (PCC) architectures, such as, but not limited to, the architecture described in "3GPP TS 23.203 V12.0.0 (2013-03), Technical Specification, 3rd Generation Partnership Project; Technical Specification Group Services and System Aspects; Policy and charging control architecture (Release 12)" (hereinafter referred to as "reference [1]"), integrate the policy and charging control.

In such a PCC architecture, the PCRF is a functional entity in charge of deciding charging, policies and quality of service (QoS) for services of a given user. The PCRF may for example decide the quality of the connection to be allocated for voice, video, etc., which results, for example, on the establishment of dedicated bearer(s) with guaranteed bit rate (GBR) or non-guaranteed bit rate (non-GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users. Based on the above decisions by the PCRF, PCC rules may be generated and then installed in a policy and charging enforcement function (PCEF) of the PCC architecture, so that each service is given the appropriate treatment that the service requires. Installing PCC rules from the PCRF in the PCEF may include the PCRF generating the PCC rules, downloading and activating said PCC rules to the PCEF, or may include activating, from the PCRF, indicated PCC rules configured in the PCEF.

The terminal device may be any type of communication terminal (or user equipment (UE)) such as, for example, a mobile phone, a smartphone, a laptop, a desktop computer, a tablet PC, a watch phone, a gaming device, an e-book reader, a fixed telephone, etc. In one embodiment, the terminal device is a multimode wireless communication device. In one embodiment, the terminal device is a device which operation is driven by a human user. In another embodiment, the terminal device is self-operable and does not require a human operating the device for communicating with a telecommunications system. The terminal device may for example be a machine-to-machine (M2M) communications device.

A service is provided to a subscriber. The service may have a plurality of components making up the service, such as for example a plurality of media components. Purely as an example, a service may be a Voice over IP (VoIP) service, and the service components may then be, for example, the video component or the audio component of the VoIP service. In one embodiment, the service is initiated by the terminal device. In another embodiment, the service is initiated by a network node such as an application server. A PDN-GW may initiate bearers for a service initiated by the UE or initiated in respect to the UE by the application server.

By "traffic associated with the service or service component", it is here meant the packet flow(s) associated with the service or service component.

In one embodiment, the execution of the fallback-treatment procedure s20 is temporary, meaning that, once it is determined that a dedicated bearer for providing the required first packet-forwarding treatment can be used (or can be used again, if it had been used before step s10), said dedicated bearer is used. Namely, the fallback-treatment procedure s20 stops and the service or service component is carried on using the required first packet-forwarding treatment.

In one embodiment, the execution of the fallback-treatment procedure s20 is conditional upon determining, for example by the PDF (on its own or jointly with another network node, such as a node hosting an application function), that it is acceptable to initiate, or carry on, the provision of the service or service component using a second packet-forwarding treatment. Such determination may for example take into account, among other things, any one of (i) the type of service at stake, (ii) the type of service component at stake, (iii) the required first packet-forwarding treatment that cannot be used, (iv) the second packet-forwarding treatment(s) that can be provided instead, (v)

subscriber data associated with the terminal device's user, (vi) the reason why the required first packet-forwarding treatment cannot be used, and (vii) a combination of the above factors. If it is determined that it is not acceptable to initiate, or carry on, the provision of the service or service component using a second packet-forwarding treatment, the service or service component may be interrupted.

In one embodiment, the fallback bearer is a default bearer, which provides the second packet-forwarding treatment. In another embodiment, the fallback bearer is a dedicated bearer, which provides the second packet-forwarding treatment.

In one embodiment, for at least one packet-forwarding treatment property, the second packet-forwarding treatment is less demanding than the first packet-forwarding treatment. "Less demanding" means less demanding for the network element(s) (i.e., network nodes, radio access networks, etc.) through which the traffic associated with the service has to transit. Exemplary packet-forwarding treatment properties include, but are not limited to, the bit rate, the delay, the jitter, the packet dropping probability, and the bit error rate.

In one embodiment, the first determining procedure s10 comprises receiving, by the network node hosting the PDF, information from a network node hosting a policy enforcement point, function or element, such as for example a PCEF. The information leads the network node hosting the PDF to determine that a dedicated bearer for providing the first packet-forwarding treatment cannot be used for a service or service component to be initiated or can no longer be used for an on-going service or service component.

In one embodiment, the fallback-treatment procedure s20 comprises notifying, by the network node hosting the PDF, a network node hosting an application function (AF), that the second packet-forwarding treatment is being provided rather than the expected first packet-forwarding treatment.

As mentioned above, FIG. 2a illustrates an embodiment wherein the method of FIG. 1 takes place when a service or service component is being established (i.e., the service or service component is sought to be initiated). Regarding FIG. 2a, it can therefore be said that the service or service component is not rejected. Instead, the fallback-treatment procedure s20a is executed. In contrast, FIG. 2b illustrates an embodiment wherein the method of FIG. 1 takes place for an on-going service. The user is already benefiting from a service. Regarding FIG. 2b, it can therefore be said that the service or service component is not interrupted. In other words, the service is not lost. Instead, the fallback-treatment procedure s20b is executed. The dashed box in the flowcharts of FIGS. 2a and 2b indicates an action which is not necessarily primarily performed by the network node hosting the PDF.

Figure 3:
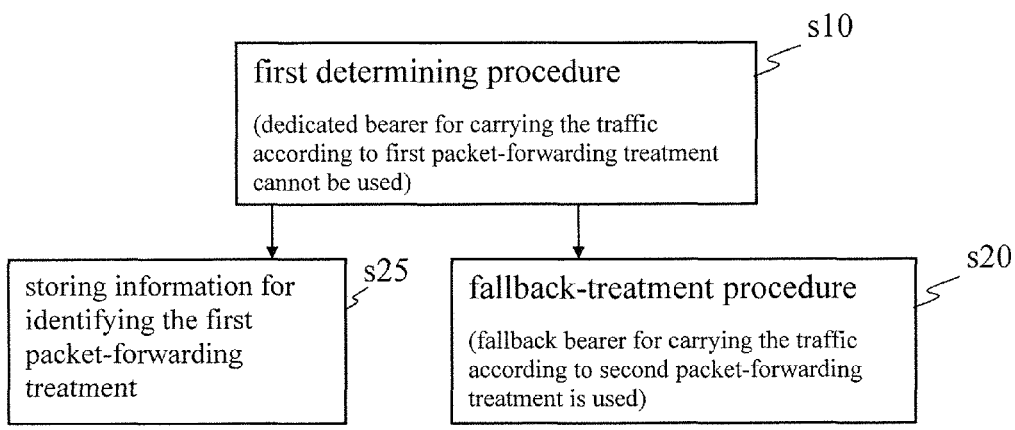
FIG. 3 is a flowchart of a method in one embodiment of the invention, wherein information for identifying a first packet-forwarding treatment is stored in parallel to a fallback-treatment procedure being executed.

FIG. 3 is a flowchart of a method in one embodiment of the invention, wherein the first determining procedure s10 and the fall-back-treatment procedure s20 are as explained above with reference to any one of FIGS. 1, 2a and 2b. Furthermore, information for identifying the first packet-forwarding treatment is stored while the fallback-treatment procedure s20 is being executed. In particular, in this embodiment, the method further comprises storing s25, while the fallback-treatment procedure s20 is being executed, information for identifying the first packet-forwarding treatment. In such a manner, the information can be used later for determining whether it is possible to use a dedicated bearer for providing the first packet-forwarding treatment. The information for identifying the first packet-forwarding treatment may be stored s25 in a storage medium of the network node hosting the PDF (i.e., in an internal storage medium) and/or in a storage medium accessible to the network node hosting the PDF (i.e., in an external storage medium).

FIG. 4 is a flowchart of a method in one embodiment of the invention, wherein the first determining procedure s10 and the fall-back-treatment procedure s20 are as explained above with reference to any one of FIGS. 1, 2a and 2b. Furthermore, in this embodiment, the fallback-treatment procedure s20 is carried out following a decision s15 to bind the flows, such as for example the IP flows, of the traffic associated with the service or service component to the fallback bearer.

FIG. 5a is a flowchart of a method in one embodiment of the invention, which differs from the embodiment illustrated with reference to FIG. 4 as follows. After executing the first determining procedure s10, the network node hosting the PDF notifies s12a a network node hosting an AF about the intention to subject the traffic associated with the service or service component to the second packet-forwarding treatment rather than to the first packet-forwarding treatment. This provides the opportunity for the network node hosting the AF to decide whether it is acceptable to provide the service or service component with the second packet-forwarding treatment rather than with the first packet-forwarding treatment. If the network node hosting the AF indicates s14b to the network node hosting the PDF that it is acceptable to provide the service or service component with the second packet-forwarding treatment, then the method proceeds to steps s15 and s20.

FIG. 5b is a flowchart of a method in one embodiment of the invention. The method is executed by a network node hosting an AF. First, the network node hosting the AF receives s12b, from a network node hosting a PDF, a notification that the network node hosting the PDF intends to make a decision to apply, to the traffic associated with a service or service component, a second packet-forwarding treatment rather than a normally prescribed first packet-forwarding treatment (which is different from the second packet-forwarding treatment). The network node hosting the AF then determines s13 whether it is acceptable to provide the service or service component with, i.e. subjected to, the second packet-forwarding treatment. If so, the network node hosting the AF sends s14a, to the network node hosting the PDF, an indication that it is acceptable to provide the service or service component with the second packet-forwarding treatment.

FIGS. 5a and 5b illustrate an embodiment wherein a network node hosting an AF determines whether it is acceptable to provide the service or service component with the second packet-forwarding treatment. In an alternative, such a decision, if any, may also be made by the network node hosting the PDF.

Figure 6:
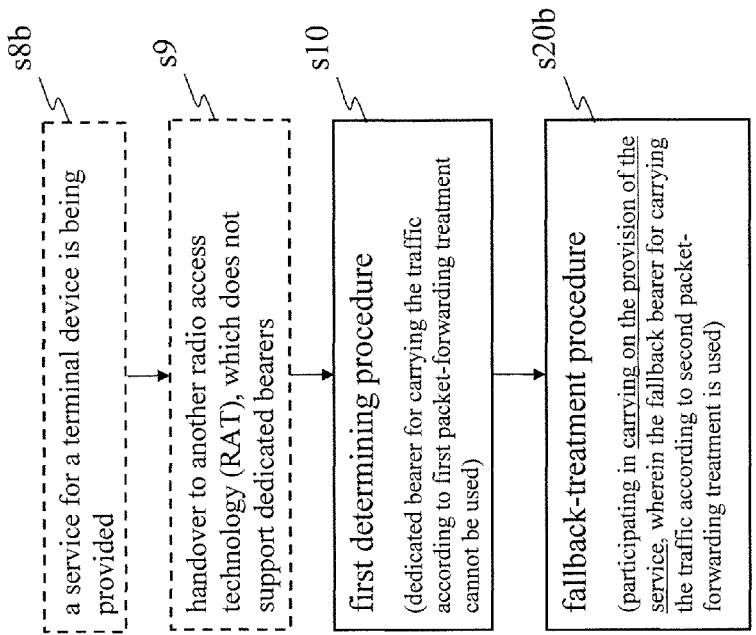
FIG. 6 is a flowchart of a method in one embodiment of the invention, wherein, for an on-going service, a hand-over to another radio access technology (RAT) occurs.

FIG. 6 is a flowchart of a method in one embodiment of the invention, which differs from the method illustrated with reference to FIG. 2b (wherein the first determining procedure s10 is carried out when the service or service component is already being provided s8b, i.e. for an on-going service) in that the first determining procedure s10 is carried out when the terminal device moves s9, i.e. hands over, from one radio access technology (RAT) to another RAT. In particular, the network node hosting the PDF determines s10 that a dedicated bearer for carrying the traffic associated with the service or service component requiring the first packet-forwarding treatment cannot be used in the other RAT (to which the terminal device is moving) because that RAT does not support dedicated bearers. In that case, the fallback-treatment procedure s20 is particularly useful. It enables to maintain the service or service component while the terminal device carries out an inter-RAT handover. The dashed boxes in the flowchart of FIG. 6 indicate actions which are not necessarily primarily performed by the network node hosting the PDF.

The handover of the terminal device from said one RAT to the other RAT may for example be a handover from a LTE RAT to an IEEE 802.11 wireless local area network (WLAN) RAT, a handover from a LTE RAT to an IEEE 802.16 wireless metropolitan area network (WMAN) RAT; or a handover from a LTE RAT to a 3GPP RAT which does not support dedicated bearers.

In one embodiment (not illustrated in the drawings), a method is provided which differs from the method illustrated with reference to FIG. 2b (i.e., method during which the first determining procedure s10 is carried out when the service or service component is already being provided s8b, i.e. for an on-going service) as follows. The first determining procedure s10 is carried out when the terminal device moves to, i.e. hands over to, a cell in which a dedicated bearer for carrying the traffic associated with the service or service component requiring the first packet-forwarding treatment cannot be used and this is because a network through which the traffic associated with the service or service component has to transit is congested. In that case, the fallback-treatment procedure s20 is particularly useful. It enables to maintain the service or service component through the congestion period.

Figure 7:
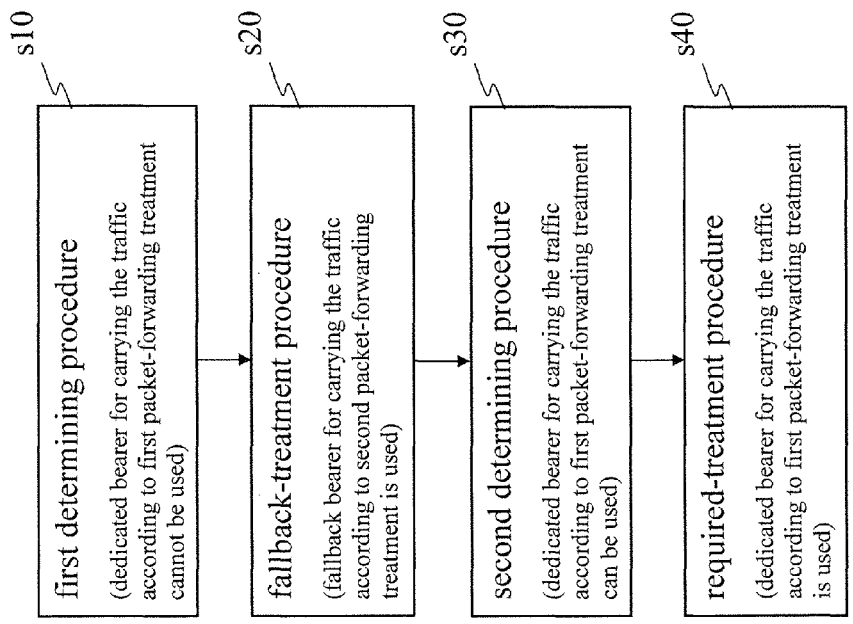
FIG. 7 is a flowchart of a method in one embodiment of the invention.

FIG. 7 is a flowchart of a method in one embodiment of the invention, which differs from the method illustrated with reference to FIG. 1 in that the method further comprises a so-called second determining procedure s30 and a so-called required-treatment procedure s40. In the second determining procedure s30, at a point in time after initiating the fallback-treatment procedure s20, the network node hosting the PDF determines that a dedicated bearer for carrying the traffic associated with the service or service component requiring the first packet-forwarding treatment can then be used. In other words, the network is now able to provide the first packet-forwarding treatment. Then, in the required-treatment procedure s40, the network node hosting the PDF participates in carrying on the provision of the service or service component using a dedicated bearer allowing the traffic associated with the service or service component to be carried with the first packet-forwarding treatment.

In order to carry out the second determining procedure s30 and the required-treatment procedure s40 illustrated with reference to FIG. 7, the network node hosting the PDF may make use of information identifying the first packet-forwarding treatment that may have been stored, i.e. kept in memory, while the fallback-treatment procedure s20 was executed (as explained with reference to FIG. 3, step s25). In other embodiments, information identifying the first packet-forwarding treatment may be derived from the second packet-forwarding treatment without requiring explicit information for identifying the first packet-forwarding treatment. For example, if no explicit information for identifying the first packet-forwarding treatment is stored, the network node hosting the PDF may be configured to determine that this means that the bit rate (or another packet-forwarding treatment property) of the second packet-forwarding treatment is 50% (percent) of the bit rate of the first packet-forwarding treatment.

Figure 8:
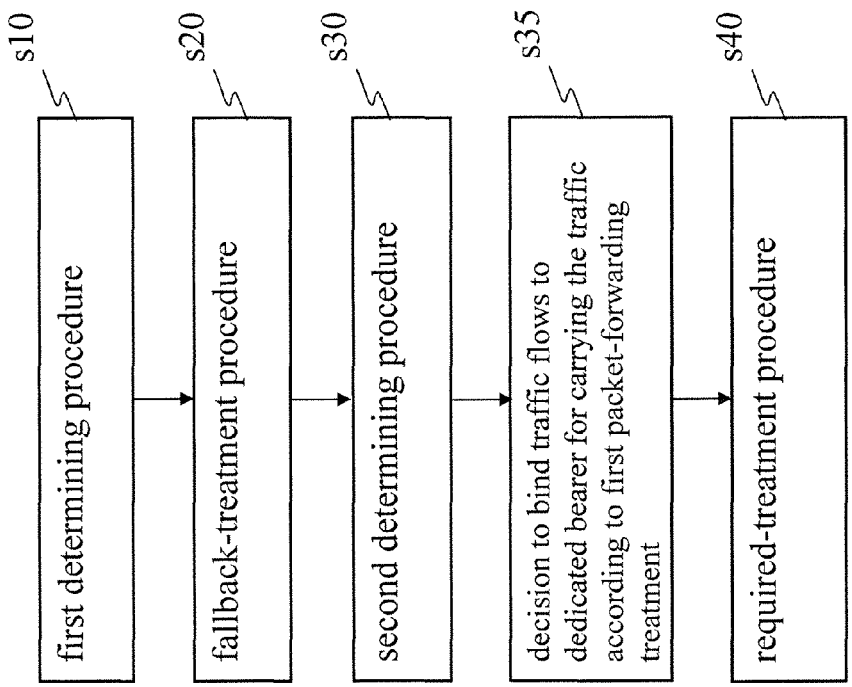
FIG. 8 is a flowchart of a method in one embodiment of the invention, wherein a requirement-treatment procedure is carried out following a decision to bind flows of traffic associated with a service or service component to a dedicated bearer.

FIG. 8 is a flowchart of a method in one embodiment of the invention, which differs from the method illustrated with reference to FIG. 7 in that the required-treatment procedure s40 is carried out following a decision s35 to bind flows of the traffic associated with the service or service component to the dedicated bearer allowing the traffic associated with the service or service component to be carried with, i.e. subject to, the first packet-forwarding treatment.

Figure 9:
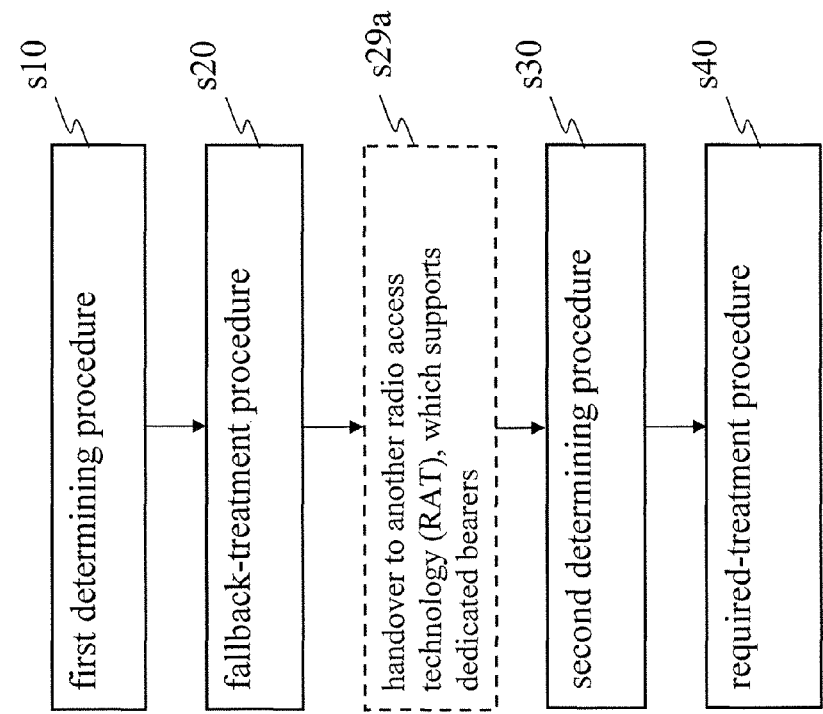
FIG. 9 is a flowchart of a method in one embodiment of the invention, wherein, while a fallback-treatment procedure is being carried out, a hand-over to another radio access technology (RAT) occurs.

FIG. 9 is a flowchart of a method in one embodiment of the invention, which differs from the method illustrated with reference to FIG. 7 as follows. The second determining procedure s30 comprises, at a point in time after initiating the fallback-treatment procedure s20 and when a handover of the terminal device from one RAT to another RAT is being performed s29a, determining that a dedicated bearer for carrying the traffic associated with the service or service component requiring the first packet-forwarding treatment can be used in the other RAT. In that case, the second determining procedure s30 and the required-treatment procedure s40 are particularly useful. These procedures enable to carry on the service or service component with the required first packet-forwarding treatment following an inter-RAT handover, when the inter-RAT handover is such that a dedicated bearer can now be set up for the first packet-forwarding treatment.

The dashed box in the flowchart of FIG. 9 indicates an action which is not necessarily primarily performed by the network node hosting the PDF. Rather, the handover is primarily performed by the terminal device. The same applies to FIGS. 10 and 11.

The handover of the terminal device to another RAT, as illustrated by step s29a in FIG. 9, may for example be a handover from an IEEE 802.11 WLAN RAT to a LTE RAT; a handover from an IEEE 802.16 WMAN RAT to a LTE RAT; or a handover from a 3GPP RAT which does not support dedicated bearers to a LTE RAT.

Figures 10, 11:
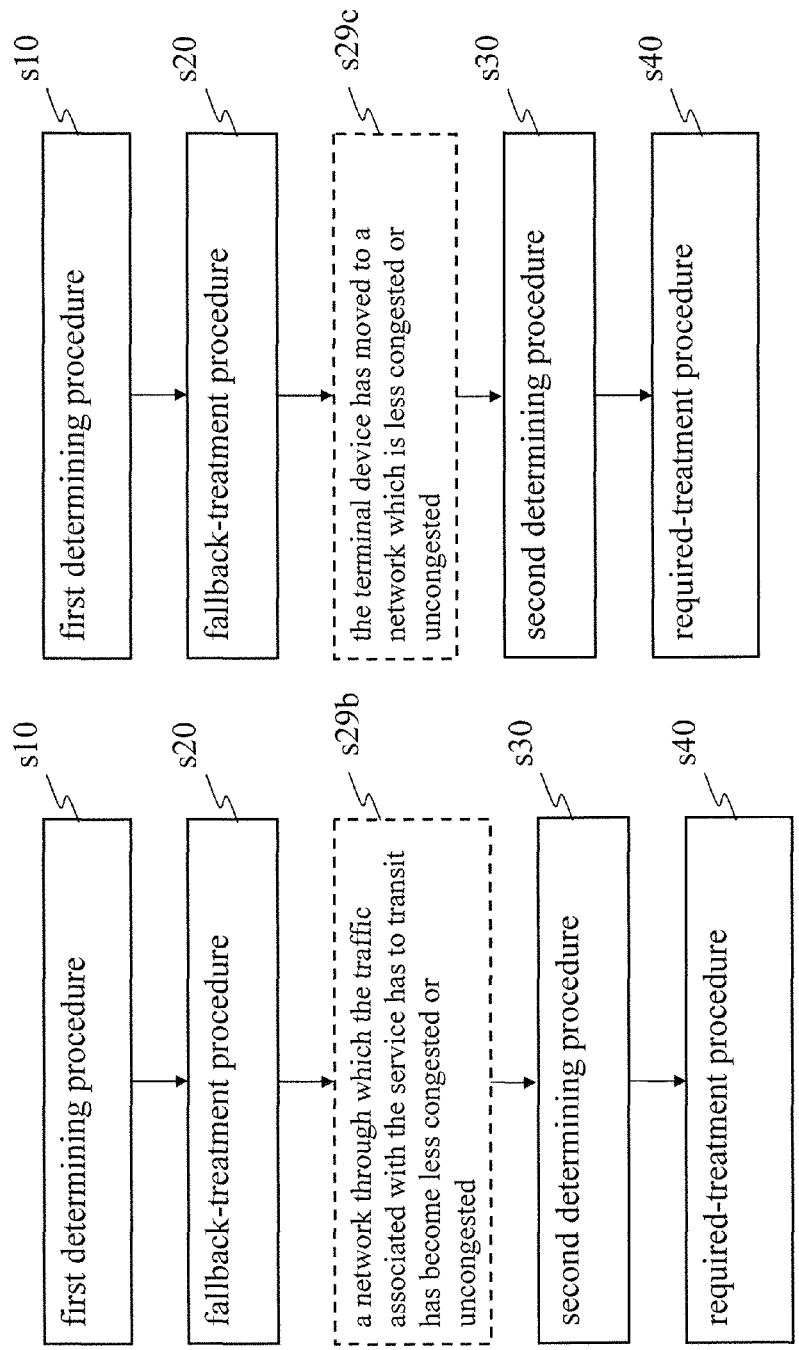
FIG. 10 is a flowchart of a method in one embodiment of the invention, wherein, while a fallback-treatment procedure is being carried out, a network through which the traffic associated with a service or service component has to transit becomes less congested or becomes uncongested.
FIG. 11 is a flowchart of a method in one embodiment of the invention, wherein, while a fallback-treatment procedure is being carried out, the terminal device moves to a network which is less congested or is uncongested.

FIG. 10 is a flowchart of a method in one embodiment of the invention, which differs from the method illustrated with reference to FIG. 7 as follows. The second determining procedure s30 comprises, at a point in time after initiating the fallback-treatment procedure s20, determining that a dedicated bearer for carrying the traffic associated with the service or service component requiring the first packet-forwarding treatment can be used because a network through which the traffic associated with the service or service component has to transit has become less congested or has become uncongested s29b. In that case, the second determining procedure s30 and the required-treatment procedure s40 are particularly useful. Indeed, these procedures enable to carry on the service or service component with the required first packet-forwarding treatment following a change in the congestion level, when the change in the congestion level is such that a dedicated bearer can now be set up for the first packet-forwarding treatment.

FIG. 11 is a flowchart of a method in one embodiment of the invention, which differs from the method illustrated with reference to FIG. 7 as follows. The second determining procedure s30 comprises, at a point in time after initiating the fallback-treatment procedure s20, determining that a dedicated bearer for carrying the traffic associated with the service or service component requiring the first packet-forwarding treatment can be used because the terminal device has moved to a network which is less congested or is uncongested s29c. In that case, the second determining procedure s30 and the required-treatment procedure s40 are particularly useful. Indeed, they enable to carry on the service or service component with the required first packet-forwarding treatment following a change in the congestion level after a handover, when the change in the congestion level is such that a dedicated bearer can now be set up for the first packet-forwarding treatment.

Now, to further understand the advantages of embodiment of the invention, the context in which some embodiments of the invention have been developed and may be put into practice will be explained in more detail, followed by the description of further embodiments.

Figure 12:
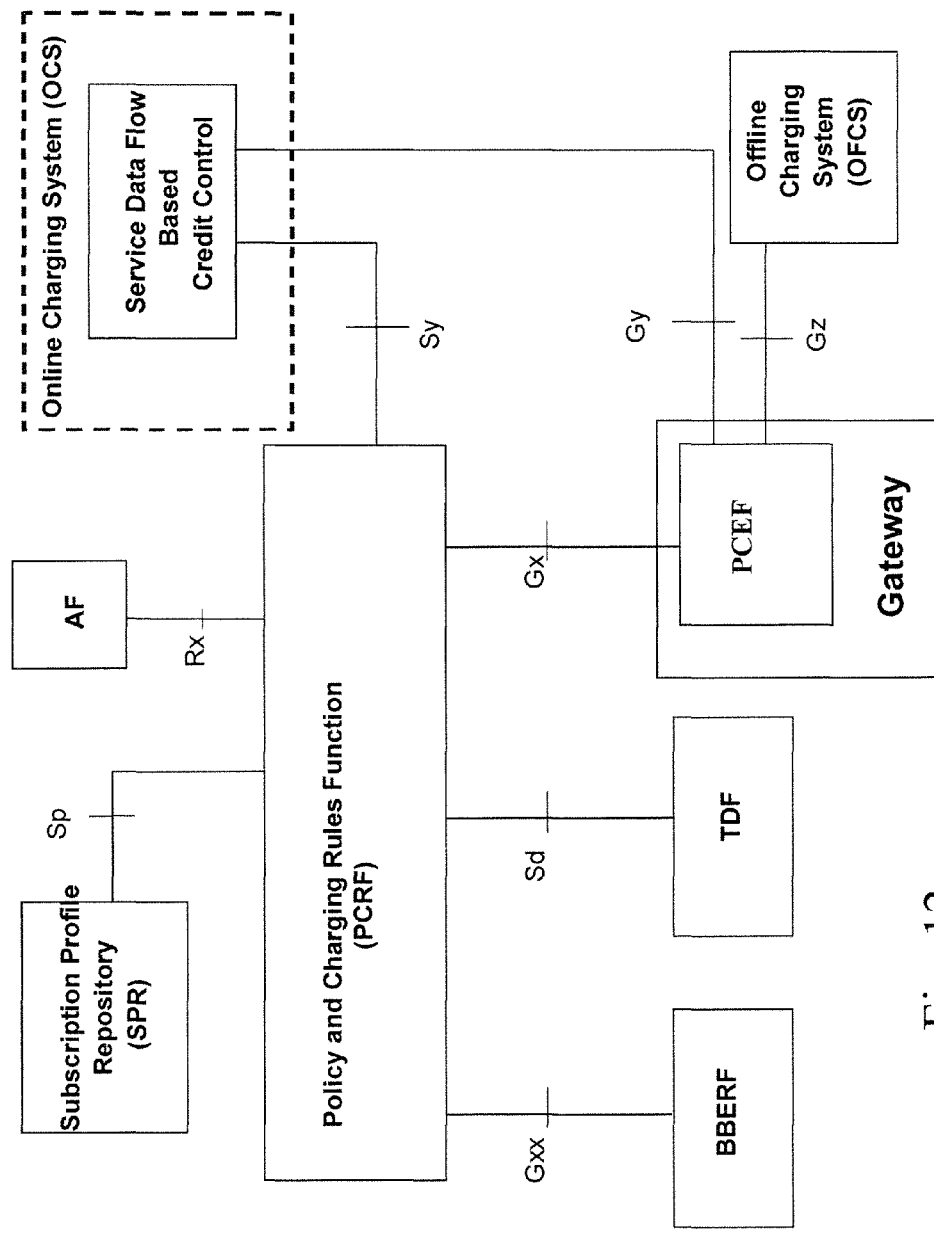
FIG. 12 schematically illustrates a policy and charging control (PCC) architecture in the context of which some embodiments of the invention have been developed and may be carried out.

FIG. 12 schematically illustrates an exemplary policy and charging control (PCC) architecture. FIG. 12 is essentially similar to the architectures illustrated in reference [1], sub-clause 5.1. Reference [1] specifies the PCC functionality for the Evolved 3GPP packet switched domain, envisaging a terminal device accessing the network via both 3GPP access networks (e.g. GPRS, UTRAN, E-UTRAN, LTE) and non-3GPP access networks (e.g. WiFi or WiMax access networks). The PCRF and AF nodes are of particular interest insofar as the background of the invention is concerned.

Some of the functional entities illustrated in FIG. 12 will now be briefly described.

The PCEF implements a policy enforcing function in respect to data flows originating and/or terminating in a communication terminal (i.e., a terminal device). In short, the functions implemented by a PCEF encompass service data flow detection, policy enforcement and flow based charging functionalities. In some cases (i.e. when no BBERF exists—see below), the PCEF also deals with enforcing QoS aspects and bearer binding. The PCEF is commonly co-located within the gateway node routing packets to/from a communications terminal. The nature of said gateway node can vary depending on the access network type used by the communications terminal. For example, the gateway node implementing the PCEF functionality may be a GGSN node (e.g. in case of 3GPP GERAN access network), or may be a so-called PDN-GW (e.g. in the case of E-UTRAN access network, or in case of non-3GPP access network, such as WiFi access networks). It provides service data flow detection, user plane traffic handling, triggering control plane session management (where the IP-CAN session permits so), QoS handling, and service data flow measurement as well as online and offline charging interactions. An IP-CAN session is a data association (i.e. "session") between a communications terminal (UE) and an IP network. The session may be identified by an address (e.g. an IP address) assigned to the UE, and an identifier associated to the UE (e.g. a UE identifier, or an identifier of the user of the UE).

The bearer binding and event reporting function (BBERF) can also implement a QoS enforcing function in respect to data flows originating and/or terminating in a communications terminal in some access network cases (as explained below). The BBERF provides functionalities such as bearer binding, uplink bearer binding verification, event reporting to the PCRF, and sending or receiving IP-CAN session specific parameters, to or from the PORE. The BBERF functionality may for example be co-located within a gateway (commonly known as "serving gateway, S-GW") in the access network to which the UE is attached. The access network to which a UE is attached may belong (in case of non-roaming) to the network of the operator to which the UE is subscribed (i.e., the home network operator), or (in case of roaming) may belong to the visited network to which the UE is currently attached (i.e., a visited network operator).

The BBERF controls the QoS that is provided to a combined set of service data flows and ensures that the resources which can be used by an authorized set of service data flows are within the "authorized resources" specified via the Gxx interface by "authorized QoS". The BBERF is only relevant for access network deployment scenarios that do not support the GTP protocol between a gateway in the access network and the node implementing the PCEF (e.g. between the S-GW and the PDN-GW that implements the PCEF).

The PCRF is a functional element that encompasses policy control decision and flow based charging control functionalities. The PCRF is a policy decision function that decides, among other, QoS policies for the data flows originated and/or terminated by a communications terminal (UE). The PCRF provides—by means of the so called "PCC rules"—: network control regarding the service data flow detection (e.g. parameters to detect when a service is initiated), gating control (i.e. parameters to allow "open or close the door" for routing packets to/from a terminal in a data session), QoS parameters (i.e. related to the flow(s) conveying packets to and/or from the terminal) and flow-based charging information, towards the PCEF. The PCRF provides—by means of the so-called "QoS rules"—network control regarding the service data flow detection and QoS control towards the BBERF. The PCRF is commonly implemented by an independent node (i.e., a policy decision point deciding policies—among other: QoS policies—in respect to data flows held by other nodes).

Two scenarios may be distinguished depending on the protocol used between the access gateway and the PCEF:
  Scenario a): GTP protocol between access gateway and PCEF (no BBERF exists, and the QoS enforcement is accomplished by the gateway node implementing the PCEF).
  Scenario b): PMIP protocol between access gateway and PCEF (a BBERF exists, and the QoS enforcement is accomplished by the gateway node implementing the BBERF).

In the case of GTP, the bearer control is fully performed in the PCEF (i.e. no BBERF exists in said case). The PCRF only sends policy information to the PCEF via the Gx interface (i.e. PCC rules comprising—among other—QoS policies), and the PCEF is responsible for its enforcing. For example, the PCEF can send the applicable values including QoS information via GTP protocol to the access gateway.

In the case of PMIP, the bearer control is performed in the access gateway that implements the BBERF functionality. The PCRF provisions PCC rules to the PCEF via the Gx reference point, and provisions the specific, corresponding QoS rules to the BBERF via the Gxx reference point. This is because the PMIP protocol does not allow conveying information about QoS, and this forces the PCRF to send the QoS values to the BBERF and the BBERF to enforce the bearer control according to the QoS information received from the PCRF.

In the case of PMIP, for each IP-CAN session, the PCRF handles one Gx session towards the PCEF and one Gxx session towards the BBERF. Both Gx and Gxx sessions for the same IP-CAN session are linked in the PCRF to maintain the PCC and QoS rules aligned between the PCEF and the BBERF.

The AF is an element offering applications in which a service is delivered in a different layer (i.e. transport layer) than the one in which the service has been requested (i.e. signalling layer). One example of an AF is the P-CSCF of the IM CN subsystem. The AF communicates with the PCRF to transfer dynamic session information (i.e., description of the media to be delivered in the transport layer). This communication is performed using the Rx interface.

Details of the information exchanged (i.e. via the so-called "Gx" or "Gxx" interfaces) between a server implementing a policy decision point (e.g. PCRF) and servers implementing policy enforcing points (e.g. a PCEF or a BBERF) are for example disclosed in "3GPP TS 29.212 V12.0.0 (2013-03), Technical Specification, 3rd Generation Partnership Project; Technical Specification Group Core Network and Terminals; Policy and Charging Control (PCC); Reference points (Release 12)" (hereinafter referred to as reference [2]).

Details of the information exchanged (i.e. via the so called "Rx" interface) between a server implementing a policy decision point (e.g. PCRF) and an AF are for example disclosed in "3GPP TS 29.214 V11.8.0 (2013-03), Technical Specification, 3rd Generation Partnership Project; Technical Specification Group Core Network and Terminals; Policy and Charging Control over Rx reference point (Release 11)" (hereinafter referred to as reference [3]).

How an exemplary PCC architecture may provide support to applications will now be briefly described.

When an application requires dynamic policy and/or charging control over the IP-CAN user plane to start a service session, the AF communicates with the PCRF to transfer the dynamic session information required for the PCRF to take the appropriate actions in the IP-CAN network. The PCRF authorizes the session information, creates the corresponding PCC/QoS rules, and installs them in the PCEF/BBERF. The PCEF/BBERF encompasses service data flow detection, policy enforcement (gate and QoS enforcement), and flow-based charging functionalities. The applicable bearer is initiated or modified, and, if required, resources are reserved for the application.

Once the application or the terminal device decides to terminate the service, the AF communicates the PCRF so that the PCRF can remove the applicable PCC/QoS rules and the PCEF/BBERF stops the corresponding service data flow detection, policy enforcement and flow-based charging functionalities, terminating or updating the applicable bearer, and releasing the corresponding resources.

The AF can subscribe to specific actions in order to be informed about certain events in the IP-CAN network. In such a case, the PCRF contacts the AF when the relevant conditions apply (e.g. release of bearer).

Exemplary bearer binding procedures will now be briefly described.

Upon reception of the PCC/QoS rules from the PCRF, the bearer binding function (BBF) (either the PCEF or the BBERF depending on the deployment scenario) performs the bearer binding, i.e. associates the provided rule to an IP-CAN bearer within an IP-CAN session. The BBF uses the QoS parameters provided by the PCRF to create the bearer binding for the rule. The binding is created between service data flow(s) included in the PCC/QoS rule and the IP-CAN bearer which have the same QoS class identifier (QCI) and ARP.

The BBF then evaluates whether it is possible to use one of the existing IP-CAN bearers or not. If none of the existing bearers can be used, the BBF should initiate the establishment of a suitable IP-CAN bearer. Otherwise, if required (e.g., QoS information has changed), the BBF initiates the modification of the corresponding bearer.

If the QCI and ARP of the PCC/QoS rule match the QCI and ARP of the default bearer, the BBF installs those rules in the default bearer.

When the PCRF requests the removal of previously provided PCC/QoS rules, the BBF deletes them and modifies the bearers accordingly. When all the PCC/QoS rules applied to one bearer have been deleted and/or deactivated, the BBF starts the bearer termination procedure.

Figure 13:
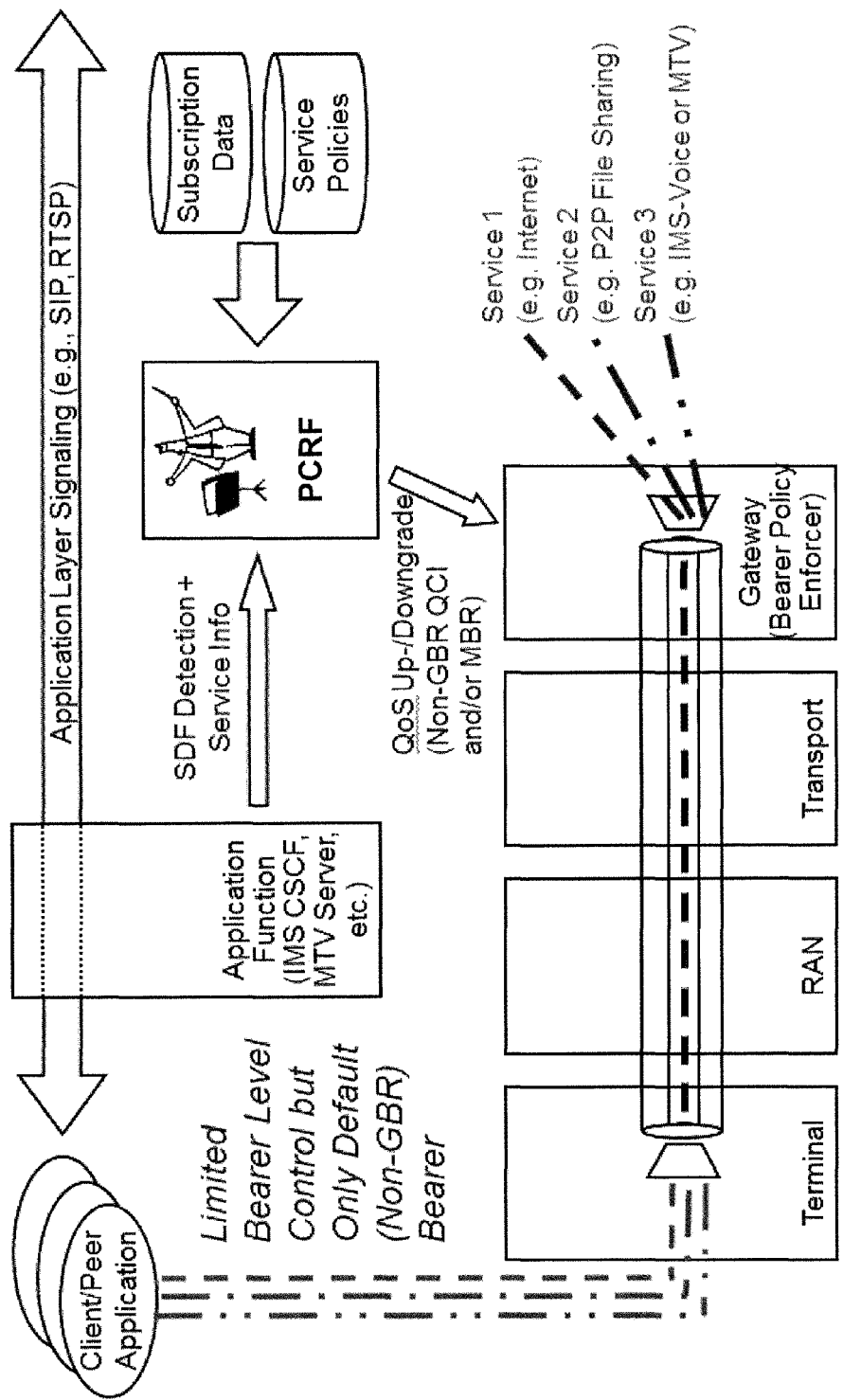
FIGS. 13 and 14 schematically illustrate systems according to non-published internal reference implementations in order to explain the context in which some embodiments of the invention have been developed.
Figure 14:
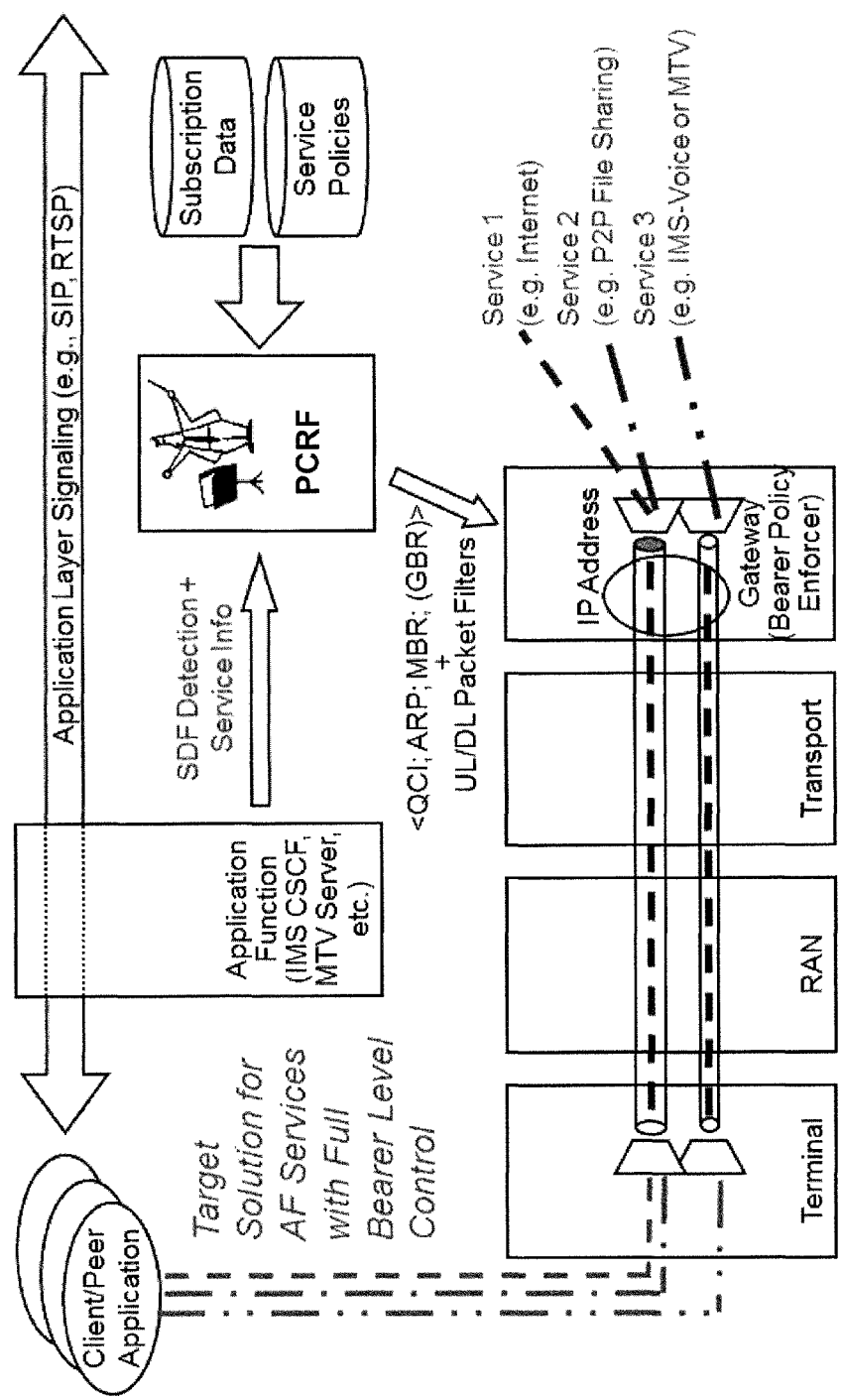
Figure 15:
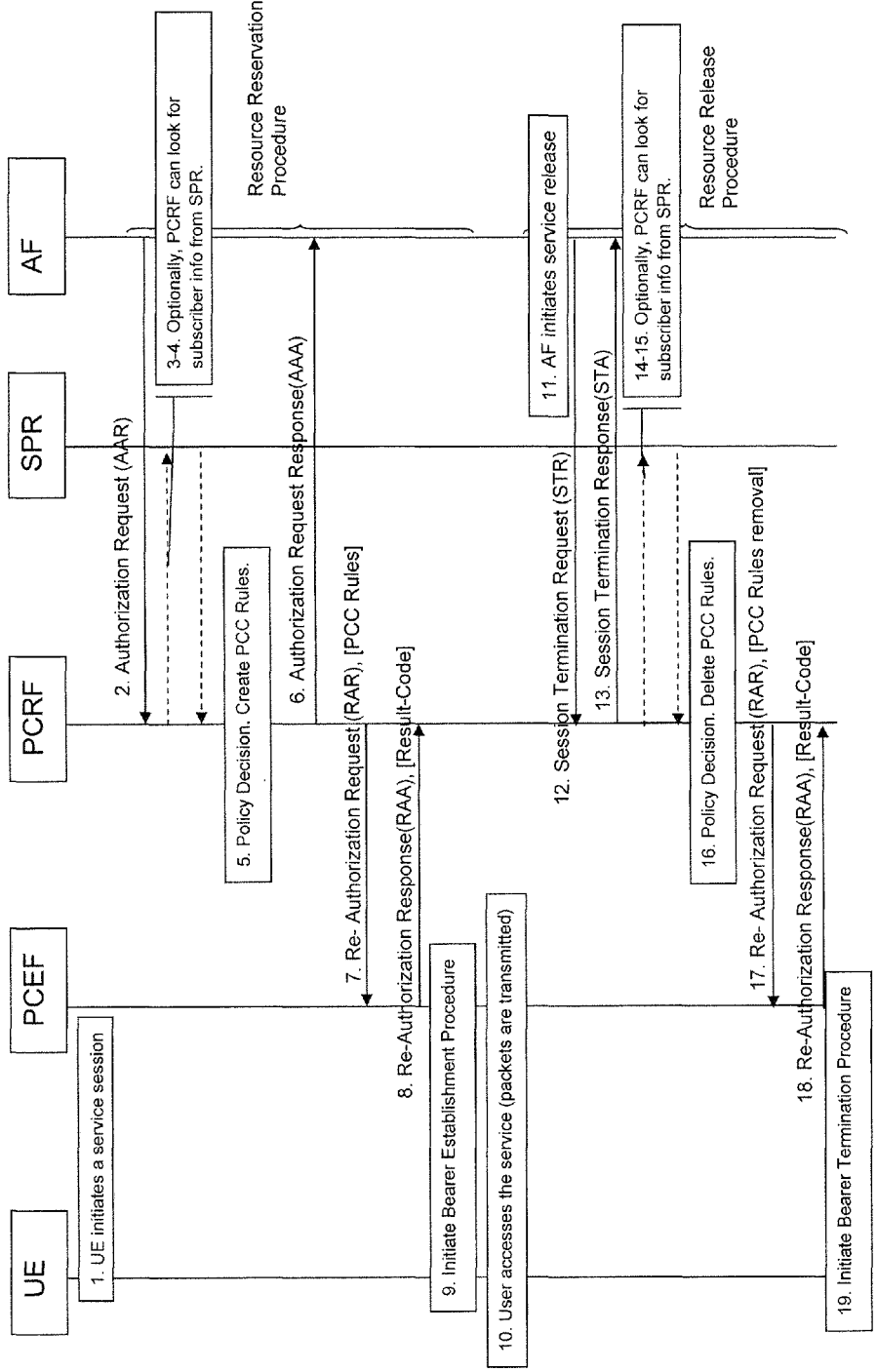
FIG. 15 is a message sequence chart of a procedure according to non-published internal reference implementation in order to explain the context in which some embodiments of the invention have been developed.

The following scenarios (1), (2), and (3) may occur depending on the QoS required for the service and the capabilities supported by the terminal device and/or the network:

(1) Dedicated bearers are not supported by the terminal device and/or network and, thus, the QCI for the derived PCC/QoS rules corresponds to the default bearer QCI (i.e. non-GBR QCI).
  FIG. 13 schematically illustrates the scenario where all the services are installed over the default bearer, in accordance with a non-published internal reference implementation.
(2) Dedicated bearers are supported by the terminal device and the network, and the QCI for the derived PCC/QoS rules corresponds to a non-GBR QCI (e.g. web browsing service).
  FIG. 14 schematically illustrates the application function service installed in a dedicated bearer, in accordance with a non-published internal reference implementation. The AF service (labelled "Service 3") is installed on a dedicated bearer (schematically depicted as a small tunnel near the bottom of the drawing). The other services (labelled "Service 1" and "Service 2") are installed in the default bearer schematically depicted as a slightly larger tunnel above the dedicated bearer.
(3) Dedicated bearers are supported by the terminal device and the network, and the QCI for the derived PCC/QoS rules corresponds to a GBR QCI (e.g. streaming service).
  FIG. 15 is a flowchart illustrating the flows for resource reservation and release, as required by an AF, in accordance with a non-published internal reference implementation. It is also possible to reserve/release resources when a transport detection function (TDF) detects the use of a service.

Here is a brief description of the steps depicted in FIG. 15:
(step 1). The UE (terminal device) initiates the establishment of a service.
(step 2). The AF asks for resource reservation by sending an AAR command to the PCRF.
(step 3). Optionally, the PCRF may contact the SPR to get the user profile (i.e., subscriber information).
(step 4). The SPR provides the PCRF with the user profile.
(step 5). The PCRF authorizes the service and creates the PCC rules related to the service.
(step 6). The PCRF answers positively to the AF by issuing an AAA command.
(step 7). The PCRF installs the created PCC rules in the PCEF, by sending an RAR command to the PCEF.
(step 8). The PCEF answers positively to the PCRF, by sending a RAA command to the PCRF.
(step 9). The PCEF reserves the required resources in the network, creating/modifying the required dedicated bearers.
(step 10). The UE (terminal device) can now use the service.
(step 11). At one point in time, the service is terminated.
(step 12). The AF sends an STR command to terminate the session with the PCRF.
(step 13). The PCRF answers back with a positive response, in the form of a STA command.
(step 14). Optionally, the PCRF may contact the SPR to get the user profile (i.e., subscriber information).
(step 15). The SPR provides the PCRF with the user profile.
(step 16). The PCC rules related to the service are deleted.
(step 17). The PCRF sends a RAR command to remove the PCC rules in the PCEF.

(step 18). The PCEF removes the PCC rules and replies to the PCRF by sending a RAA command.

(step 19). The PCEF releases the resources in the network, deleting/modifying the applicable dedicated bearer.

Let us now discuss some of the problems addressed by embodiments of the invention, for further understanding the context in which some embodiments of the invention have been developed.

Some embodiments of the invention address the problem of losing a telecommunications service on-going for a terminal device (such as a UE), or rejecting the establishment of a service either requested by the terminal device (UE) or terminating in the terminal device. The existence of this problem has been recognized by the inventors.

For already on-going services, the problem appears for example when a terminal device (UE) moves to a new access network that cannot support the establishment of ("default" or "dedicated") bearers with the required QoS for the data flow(s) involved in the provision of a service, or for example when the current access network utilized by the terminal device—or even the core network connected to said access network—experiences a congestion which requires downgrading the QoS of the bearer(s) conveying current data flow(s) of the terminal device. This problem is referred to as "case A".

For services requested by, or for, the terminal device (UE) (i.e. originating or terminating services), or in other words for services sought to be initiated for the benefit of the terminal device, the problem appears when the establishment of bearers with the QoS required by the data flow(s) of the service cannot be granted for similar reasons as above. Namely, this may be because of QoS limitations in the access network to which the terminal device is currently connected, or because of congestion in said access network or even in the core network. This problem is referred to as "case B".

It has been recognized by the inventors that, in these situations, an ongoing service will be dropped (case A), or a new service requested by, or for, (i.e., sought to be initiated by, or for) a terminal device will be rejected (case B).

According to prior art procedures, the AF serving a service to the terminal device establishes a session (i.e. through the "Rx" interface) with the PCRF to allow the use of a service according to certain QoS and charging demands. A TDF may also establish a session (i.e. through the "Sd" interface with the PCRF) in respect to a service (initiated or terminating at the terminal device) as detected by the TDF. The PCRF creates PCC/QoS rules according to the service request received from the AF, or according to the service detection information received from the TDF and sends these rules to the PCEF/BBERF which installs them in an existing bearer or initiates the establishment of a new dedicated bearer with the QoS characteristics required.

These prior art procedures can be explained in more details as follows in relation, firstly to case A, and secondly to case B.

Case A:

Initially, the terminal device is connected through a certain network, for example a LTE network, and a PCRF, upon an AF request, successfully installs some PCC/QoS rules in the PCEF/BBERF with certain QoS values that require the establishment of one or several dedicated bearers. For example, a videoconference service has been negotiated, that requires the establishment of two guaranteed dedicated bearers, a first one for the service video flows and a second one for the service voice flows. This assures a good QoS for the negotiated service.

At a certain point in time during the session, it might occur that the QoS requirements initially requested (or negotiated) for the service can no longer be maintained. This may for example be because the terminal device moves to a new network where the required QoS is not supported or the current network is congested (or both). In such a situation, all the dedicated bearers established for this service are removed and the PCRF is informed by the PCEF/BBERF about the PCC/QoS rules failure. According to prior art procedures, when all the service flows are affected, the PCRF initiates the application service session termination towards the AF, and the AF session is terminated. The AF terminates the service session with the terminal device. If only some of the service flows are affected, for example in the case of a video conference if the network can only allocate the resources for the video flows but can maintain the resources for the voice flows, the AF, upon notification from the PCRF, may decide whether to terminate or maintain the service.

Figure 16:
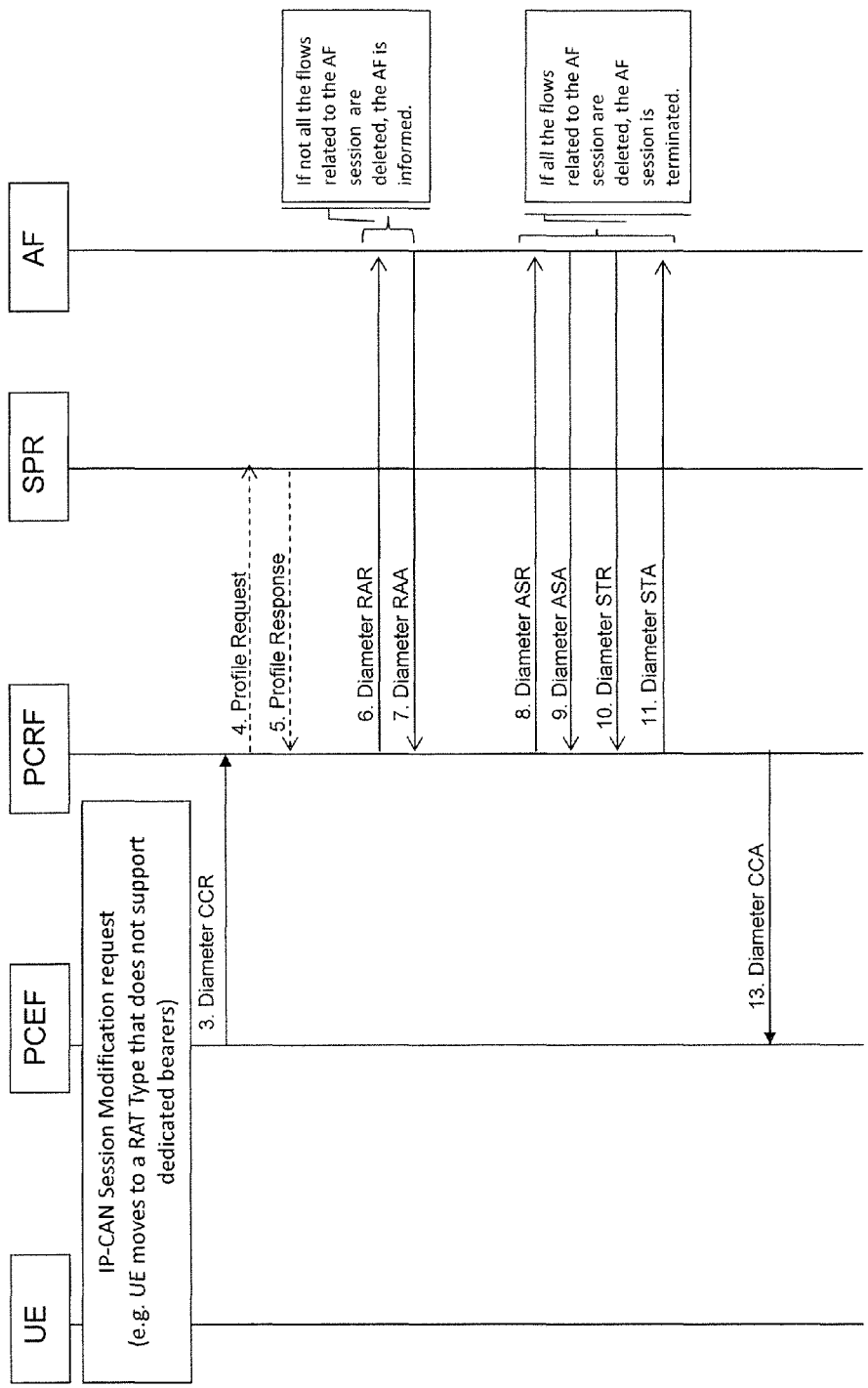
FIG. 16 is a message sequence chart of a prior art procedure in order to explain the context in which some embodiments of the invention have been developed.

FIG. 16 is a simplification of FIG. 4.3.2.1.1 of "3GPP TS 29.213 V11.6.0 (2013-03), Technical Specification, 3rd Generation Partnership Project; Technical Specification Group Core Network and Terminals; Policy and Charging Control signalling flows and Quality of Service (QoS) parameter mapping (Release 11)" (hereinafter referred to as reference [4]), corresponding to PCEF-initiated IP-CAN session modification procedures. For this specific case, the IP-CAN session modification has occurred because the PCC rules have been removed/deactivated (e.g. the dedicated bearer is deactivated in a congestion situation or in a situation when the user moves to a network that does not support dedicated bearers). Only relevant steps are shown. For readability purposes, the steps are numbered as in the mentioned figure.

Thus, FIG. 16 shows an IP-CAN session modification initiated by the PCEF (including the reporting of PCC rule removal/deactivation).

(step 3). Upon reception of an IP-CAN session modification request (e.g., the terminal device hands over to a new access network; for example, it hands over to an access network having a radio access type (RAT) that does not support dedicated bearers or there is congestion in the network), the PCEF informs the PCRF. In this case, since the PCC rules related to a service are deactivated, the PCRF is informed that the resources are not allocated. The affected PCC rules are provided in the message.

(step 4). The PCRF may contact the SPR to obtain the subscriber profile.

(step 5). The SPR provides the PORE with the subscriber profile.

Steps 6, 7 and steps 8, 9, 10, 11 are exclusive. This means that either steps 6 and 7 occur, or steps 8, 9, 10 and 11 occur.

(step 6). If not all the flows related to an AF session are deleted (e.g. if the service includes audio and video and only the dedicated bearer related to video is terminated), the AF is informed (if it requested to be informed).

(step 7). The AF answers successfully. It is up to the AF to take further actions (e.g. to terminate the AF session).

(step 8). If all the flows related to an AF session are deleted (i.e., all the dedicated bearers related to certain service are terminated), the PCRF informs the AF that the session has to be aborted.

(step 9). The AF answers successfully.

(step 10). In accordance with Diameter procedures, the client (i.e. the AF) terminates the Diameter session by sending an STR.
(step 11). The PCRF answers successfully.
(step 13). The PCRF answers to the PCEF. Additional information can be provided (new events, PCC rules, etc.).

According to these flows, the service is either partially terminated (steps 6 and 7) or totally terminated (steps 9-11) and the service cannot be recovered until the user asks again for the service establishment.

If, during the same session, the initial service QoS requirements can be again fulfilled, for example because the user moves to another network or because the network is no longer congested (e.g., the PCRF detects that dedicated bearers can be established for new/modified services for the same or different user), according to procedures as illustrated by FIG. 16, the service is not re-established unless the terminal device initiates once again the service request. This situation is undesirable.

Case B:

Initially, the terminal device is connected to a certain network where the QoS requirements received from the AF cannot be fulfilled. In such a situation, the PCEF/BBERF informs the PCRF about the PCC/QoS rules installation failure, and the PCRF, according to prior art procedures, initiates the application service session termination towards the AF, and the AF session is terminated. It is also possible that the PCRF does not authorize the establishment of the AF session if the reason why the QoS requirements are not fulfilled is known in advance (e.g. the RAT type does not support the establishment of dedicated bearers).

If, during the same session, the initial service QoS requirements can be fulfilled, because the user moves to another network or because the initial network may accept the QoS requirements, the service is, according to prior art procedures, not re-established unless the terminal device initiates once again the service request.

Some embodiments of the invention solve the above-described problems.

In some embodiments, a solution is provided which comprises making a policy decision by a network node hosting a PDF (such as for example a PCRF), to bind the flow(s) of a service to one or more bearers with a less demanding QoS than normally required (e.g. bearer(s) which data flow(s) has/have: less bandwidth, non-GBR, fewer QCI, etc.). This may imply binding all of the (one or more) data flows of the service to the default bearer and, thus, to the QoS parameters associated to said default bearer. In other words, rather than tearing down the service—or refusing the establishment of some dedicated bearers—because the required QoS cannot be provided, the QoS required by the flow(s) of the service is downgraded by virtue of a policy decision made by a network node hosting a PDF (such as for example a PCRF). The QoS downgrading decision may be made in any of the cases "A" or "B" discussed earlier.

The user of the terminal device may therefore experience some degradation on the QoS, but at least does not lose the service (or gets rejected when the service is sought to be initiated). Some embodiments of the invention thus provide a solution that allows dynamically updating the QoS of a service without service interruption.

In one embodiment, in order to be able to re-instantiate back the QoS originally required for the service (or for a component thereof), the network node hosting the PDF (such as for example a PCRF) executes the following steps:

(i) It stores information about the original QoS required for the service (i.e. the service whose QoS has been downgraded). This can include originally required QoS parameters for the one or more flows required by the service. This step (i) corresponds to step s25 as discussed with reference to FIG. 3.

(ii) It monitors whether the condition(s) for the previous QoS downgrading has/have ceased. For example, it determines whether the terminal device has handed over its connection to a new access network that allows the establishment of bearers that can provide the QoS originally requested for the data flow(s) of the service, or whether the congestion condition in the access and/or core network has disappeared; and, if so, it proceeds to step (iii). This step (ii) corresponds to the second determining procedure s30 discussed with reference to FIG. 7.

(iii) It upgrades the bearers currently allocated to convey the flow(s) of the service, so that the number and/or QoS of the upgraded bearer/s fits with the QoS requirements originally required by the service. This can involve the establishment of new bearers, and/or changing of QoS parameters associated to existing bearer(s). This step (iii) corresponds to the required-treatment procedure s40 discussed with reference to FIG. 7.

In one embodiment, the network node hosting the PDF (such as for example a PCRF) notifies an application server (i.e., a network node hosting an AF) involved in the provision of the service about the changes (i.e. downgrade and upgrade) in the QoS of the service.

In one embodiment, dynamic services over LTE but also WiFi are provided. In contrast to prior art procedures, when a terminal device moves from LTE to WiFi where dedicated bearers are not supported, the dynamic service is, in this embodiment of the invention, not terminated. The service is maintained although the terminal device temporarily moves to WiFi access.

Some embodiments of the invention provide solutions for the above-mentioned network scenarios involving a telecommunications network comprising a PCC architecture. In particular, some embodiments address the problem of a service requiring a certain QoS for which the QoS requirements cannot be fulfilled, but still the network operator is interested in allowing the service access.

In particular, in one embodiment, a QoS degradation of a service is carried out. The QoS of an established service may be degraded following a network handover or as a consequence of a congestion situation.

In another embodiment, a QoS degradation of a service is carried out in a situation where a terminal device seeks to establish (either as a service originator, or as a service terminator) a service and, at that point in time, the network cannot fulfill the QoS requirements.

This may involve in the PCRF the following steps:

An installation of the service on the default bearer or the activation of the service using dedicated bearers with less demanding properties, so that the network can accept them. This essentially corresponds to the fallback-treatment procedure s20 as discussed above with reference to FIG. 1, notably.

Then, the reinstallation of the service to achieve the initially required (or negotiated) service QoS conditions when the network is able to provide these conditions. This essentially corresponds to the second determining procedure s30 and the required-treatment procedure s40 as discussed above with reference to FIG. 7, notably.

Optionally, the PCRF notifies an AF about the QoS change (via the "Rx" interface of FIG. 12, which functionality may be extended to accomplish with this purpose).

Two embodiments of the invention will now be discussed with reference to FIGS. 17 and 18 respectively. The embodiment discussed with reference to FIG. 17 relates to a case of an on-going service (case A) and the embodiment discussed with reference to FIG. 18 relates to a case where a service is sought to be initiated (case B).

In the embodiment illustrated with reference to FIG. 17 (case A), a terminal device is connected to a network that fulfils QoS requirements. Then, the terminal device moves to, i.e. hands over to, a network where the QoS requirements can no longer be fulfilled (the network does not provide for the required dedicated bearer support). In other words, a service that requires certain QoS is on-going and a proper dedicated bearer is established for that purpose. The resource reservation as described with reference to FIG. 15 has thus occurred.

Figure 17:
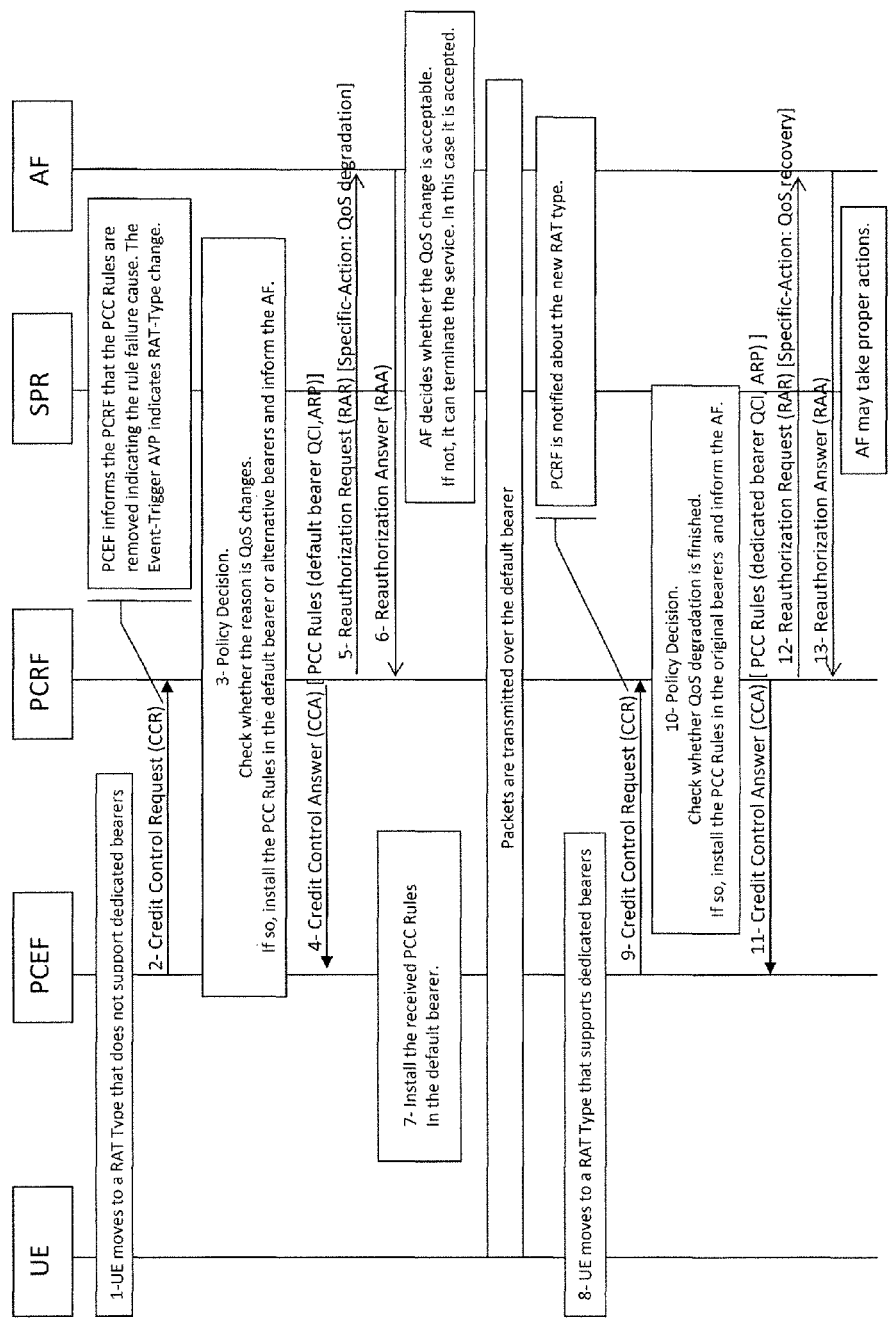
FIGS. 17 and 18 are message sequence charts of methods in embodiments of the invention.

The embodiment illustrated with reference to FIG. 17 shows a deployment with GTP, so that no BBERF is present.

Initially, the terminal device has established a PDN connection. An AF session for certain service (e.g. video conference) has been initiated and the service has been successfully installed in a dedicated bearer.

(step 1). The terminal device moves from a RAT that supports dedicated bearers (e.g. LTE) to another RAT type that does not support them. This is illustrated by the box labelled "1—UE moves to a RAT Type that does not support dedicated bearers" in FIG. 17.

(step 2). The PCEF cannot maintain the dedicated bearers and removes the PCC rules that were installed in those bearers in the same manner as in the above-discussed prior art procedures. The PCRF is informed about the removal, the reason and is also notified about the RAT type change in a CCR command. This is illustrated by the arrow labelled "2-Credit Control Request (CCR)" and by the box labelled "PCEF informs the PCRF that the PCC Rules are removed indicating the rule failure cause. The Event-Trigger AVP indicates RAT-Type change."

(step 3). The PCRF then determines, based on the received information, that the QoS cannot be maintained in the current conditions. This part of step 3 corresponds to the first determining procedure s10 as discussed with reference to FIG. 1, notably.

The PCRF decides to install the PCC rules related to the affected service in the default bearer, i.e. it assigns the QCI and ARP of the default bearer to those PCC rules. This part of step 3 corresponds to the fallback treatment procedure s20 as discussed with reference to FIG. 1, wherein, in the present case, the fallback bearer is the default bearer.

If dedicated bearers are still supported but not possible for the network to maintain, the PCRF can also update the PCC rules to use less demanding dedicated bearers (lower bandwidth and/or other QCI/ARP values). This part of step 3 corresponds to the fallback treatment procedure s20 as discussed with reference to FIG. 1, wherein, in the present case, the fallback bearer is a dedicated bearer.

In order to be able to (if it proceeds) re-instantiate later (e.g. step 10) the original QoS to the service, the PCRF may store (e.g. on a local memory) information about the original QoS that is to be downgraded. This optional part of step 3 corresponds to step s25 as discussed with reference to FIG. 3.

Step 3 is illustrated by the box labelled "3-Policy Decision. Check whether the reason is QoS changes. If so, install the PCC Rules in the default bearer or alternative bearers and inform the AF."

(step 4). The CCA command includes the modified PCC rules. This is illustrated by the arrow labelled "4-Credit Control Answer (CCA) [PCC Rules (default bearer QCI, ARP)]".

(step 5). The PCRF informs the AF about the QoS degradation by using a new Specific-Action AVP value. An AVP is an information element conveyed in some protocol messages, such as e.g. in Diameter commands. This step is illustrated by the arrow labelled "5-Reauthorization Request (RAR) [Specific-Action: QoS degradation]".

This step corresponds to step s12a discussed with reference to FIG. 5a, as well as step s12b discussed with reference to FIG. 5b.

(step 6). The AF decides whether it is acceptable to provide the service in those conditions. If it is so, it answers positively and takes no further action. This step is illustrated by the arrow labelled "6-Reauthorization Answer (RAA)" and by the box labelled "AF decides whether the QoS change is acceptable. If not, it can terminate the service. In this case it is accepted."

This step corresponds to steps s13 and s14a discussed with reference to FIG. 5b, as well as step s14b discussed with reference to FIG. 5a.

(step 7). The terminal device continues using the service on the default bearer. This step is illustrated by the boxes labelled "7-Install the received PCC Rules In the default bearer." and "Packets are transmitted over the default bearer". This step corresponds to the fallback-treatment procedure s20 discussed notably with reference to FIG. 1.

(step 8). The UE moves to a RAT type that supports dedicated bearers. This step is illustrated by the box labelled "8-UE moves to a RAT Type that supports dedicated bearers" and corresponds to step s29a discussed with reference to FIG. 9.

(step 9). The PCRF is informed with a CCR command that includes the related event trigger and the new RAT type. This step is illustrated by the arrow labelled "9-Credit Control Request (CCR)" and by the box labelled "PCRF is notified about the new RAT type."

(step 10). The PCRF then determines that the QoS degradation is no longer necessary anymore. The PCC rules related to packet flows of that service are modified in order to include the proper (i.e. original QoS) QCI and ARP, i.e. the first packet-forwarding treatment. This step is illustrated by the box labelled "10-Policy Decision. Check whether QoS degradation is finished. If so, install the PCC Rules in the original bearers and inform the AF." Step 10 corresponds to the second determining procedure s30 and then the required-treatment procedure s40 discussed with reference to FIG. 7, notably.

(step 11). The PCRF provides the modified PCC rules in a CCA command to the PCEF. This step is illustrated by the arrow labelled "11-Credit Control Answer (CCA) [PCC Rules (dedicated bearer QCI, ARP)]".

(step 12). The PCRF informs the AF about the reestablishment of the QoS conditions. This step is illustrated by the arrow labelled "12-Reauthorization Request (RAR) [Specific-Action: QoS recovery]".

(step 13). The AF may take proper actions (e.g. logs for statistics, etc.). This step is illustrated by the arrow labelled "13-Reauthorization Answer (RAA)" and by the box labelled "AF may take proper actions."

In the embodiment illustrated with reference to FIG. 18 (case B), the terminal device is in the process of being connected to a network where the required QoS cannot be fulfilled. In such a case, QoS reservation cannot be granted when the AF session is initiated.

Figure 18:
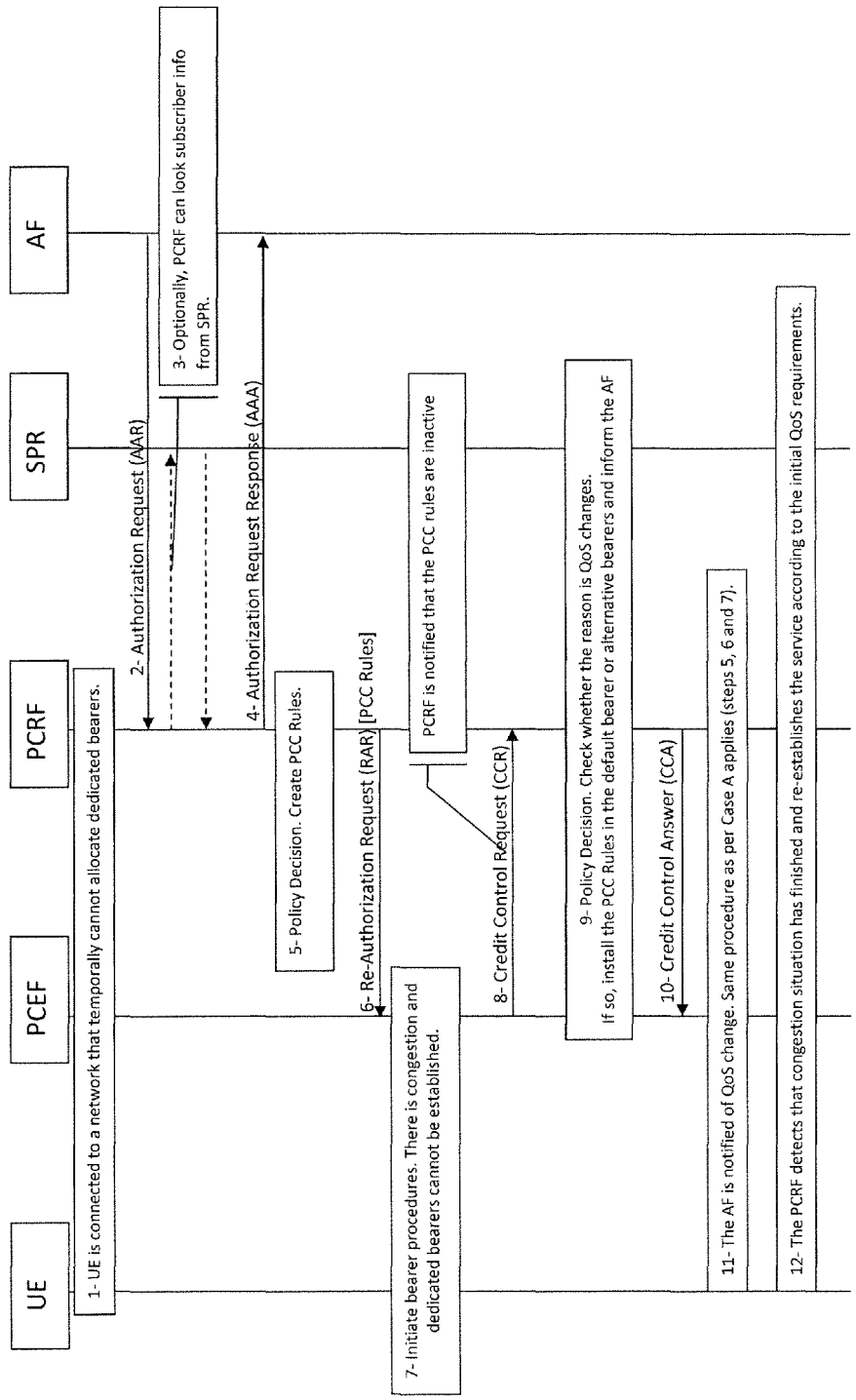

The embodiment illustrated with reference to FIG. 18 shows a deployment with GTP, so that no BBERF is present.

Initially, the conditions upon initial attachment of the terminal device to the network do not allow the dedicated bearers with the QoS required by the service.

(step 1). The terminal device establishes a PDN connection in a network that cannot setup the dedicated bearers. In this example, the reason is that the network is congested. This is illustrated by the box labelled "1-UE is connected to a network that temporally cannot allocate dedicated bearers."

(step 2). The AF initiates an AF session establishment as in the above-discussed prior art procedures. This is illustrated by the arrow labelled "2-Authorization Request (AAR)".

(step 3). The PCRF may check whether some subscription information is required to authorize the AF session request. This is illustrated by the box labelled "3-Optionally, PCRF can look subscriber info from SPR."

(step 4). The PCRF acknowledges the AF request. This is illustrated by the arrow labelled "4-Authorization Request Response (AAA)".

(step 5). In this example, the PCRF is unaware that the network will not support the dedicated bearers and thus creates the appropriate PCC rules with the QCI and ARP according to the application demands. This is illustrated by the box labelled "5-Policy Decision. Create PCC Rules."

(step 6). The PCRF sends a RAR command with the created PCC rules. This is illustrated by the arrow labelled "6-Re-Authorization Request (RAR) [PCC Rules]".

(step 7). The network initiates the bearer procedures and, due to congestion reasons, the dedicated bearer cannot be established. This is illustrated by the box labelled "7-Initiate bearer procedures. There is congestion and dedicated bearers cannot be established."

(step 8). The PCRF is notified that the PCC rules are inactive in a new CCR command, including the failure reason. This is illustrated by the arrow labelled "8-Credit Control Request (CCR)" and by the box labelled "PCRF is notified that the PCC rules are inactive". This corresponds to the first determining procedure s10 discussed notably with reference to FIG. 1.

(step 9). The PCRF then checks its configured policy as to whether it can degrade the QoS. If so, it modifies the affected PCC rules with new QCI and ARP values, installing the service in the default bearer or in a dedicated bearer with lower QoS requirements. This is illustrated by the box labelled "9—Policy Decision. Check whether the reason is QoS changes. If so, install the PCC Rules in the default bearer or alternative bearers and inform the AF" and corresponds to the fallback-treatment procedure s20 discussed notably with reference to FIG. 1.

In order to be able to (if it proceeds) re-instantiate later (e.g. step 12) the original QoS to the service, the PCRF may store (e.g. on local memory) information about the original QoS that is to be downgraded. This corresponds to step s25 discussed with reference to FIG. 3.

(step 10). The modified PCC rules are installed. This is illustrated by the arrow labelled "10—Credit Control Answer (CCA)".

(step 11). The procedure is now the same as for case A (i.e., FIG. 17), steps 5, 6 and 7. This is illustrated by the box labelled "11—The AF is notified of QoS change. Same procedure as per Case A applies (steps 5, 6 and 7)."

(step 12). At this point, the PCRF may determine that congestion situation has been resolved, and that dedicated bearers can be allocated again (e.g. the PCRF has detected that dedicated bearers has been successfully established for other new/modified services for the same or different user). If so, the PCRF can modify the PCC rules relating to the above-mentioned service in order to include the proper (i.e., original QoS) QCI and ARP. The procedure is then the same as that for case A, from steps 10 to 13. This step is illustrated by the box labelled "12—The PCRF detects that congestion situation has finished and re-establishes the service according to the initial QoS requirements." and this corresponds to the second determining procedure s30 and the required-treatment procedure s40 discussed with reference to FIG. 7.

It is also possible, in one embodiment, that the PCRF knows in advance that the dedicated bearers cannot be allocated. In such a case, the PCRF may already indicate so in step 4 above (in FIG. 18) and install the PCC rules with the QCI and ARP of the default bearer in step 6 or in a bearer with lower QoS requirements.

In one embodiment, the "Rx" interface, for example described in reference [3], is extended to convey notifications about temporary QoS degradation to an AF. The invention is, however, not limited to such Rx interfaces. Rx interfaces may also be provided with the possibility to send such notifications to the AF. If the Rx interface is extended to convey notifications about temporary QoS degradation to an AF, the value of the standard AVP called "specific-action" may for example convey a new value indicating "QoS-degradation". In a sub-embodiment, the "specific-action" AVP may be structured so as to convey more specific information and notify the AF e.g. about the QoS the network can grant (e.g. only the QoS associated to the default bearer).

In one embodiment, the PCRF functionality is configured to support the procedures explained above notably with reference to FIGS. 1 to 11. In one embodiment, the PCRF is configured to detect situations where temporarily the QoS requirements of a dynamic service cannot be fulfilled, and to take actions based on policies upon these situations. In one embodiment, the PCRF is configured to react when the initially (original) QoS requirements demanded by the dynamic service can be achieved again, and if so, take the corresponding actions to allocate these resources in the network. In one embodiment, the PCRF is configured to hide the situation to the AF, keeping the service active. In one embodiment, the PCRF is configured to notify the AF about the QoS changes.

As explained above, some embodiments of the invention are therefore advantageous in that they provide a mechanism to deal with situations where temporarily the packet-forwarding treatment requirements, or the QoS requirements, of a dynamic service cannot be achieved, and a proactive mechanism to re-establish the initial packet-forwarding treatment requirements, or the initial QoS requirements, when the temporary reasons that caused the QoS degradation have disappeared. Some embodiments of the invention are therefore also advantageous in that they minimize the impacts provoked by temporary situations, maintaining the service and therefore improving the end-user perception.

Figure 19:
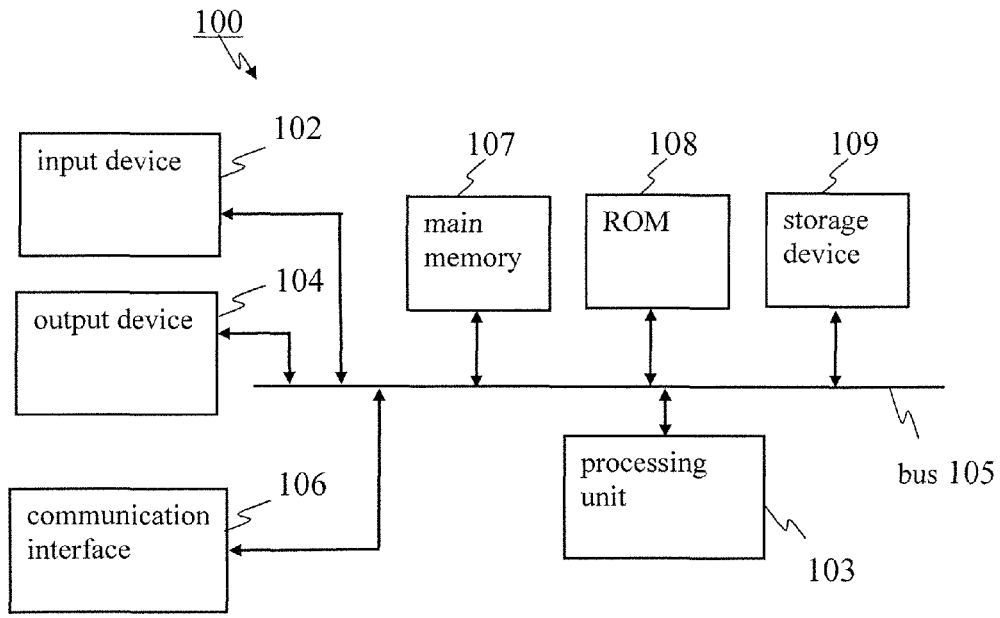
FIG. 19 is a schematic diagram of an exemplary implementation of a network node according to one embodiment of the invention.

FIG. 19 is a schematic diagram of an exemplary implementation of a network node 100 that may be used in embodiments of the invention. As illustrated, network node 100 may include a bus 105, a processing unit 103, a main memory 107, a ROM 108, a storage device 109, an input device 102, an output device 104, and a communication interface 106. Bus 105 may include a path that permits communication among the components of network node 100.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to network node 100, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables network node 100 to communicate with other devices and/or systems (such as with a network node hosting an AF, a network node hosting a PCEF, etc.). For example, communication interface 106 may include mechanisms for communicating with another device or system via a network.

Network node 100 may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as the first determining procedure s10, the fallback-treatment procedure s20, etc. Alternatively, hardwired circuitry may be used in place of or in combination with software instructions to implement processes and/or operations described herein. Thus, implementations described herein are not limited to any specific combination of hardware and software.

Figure 20:
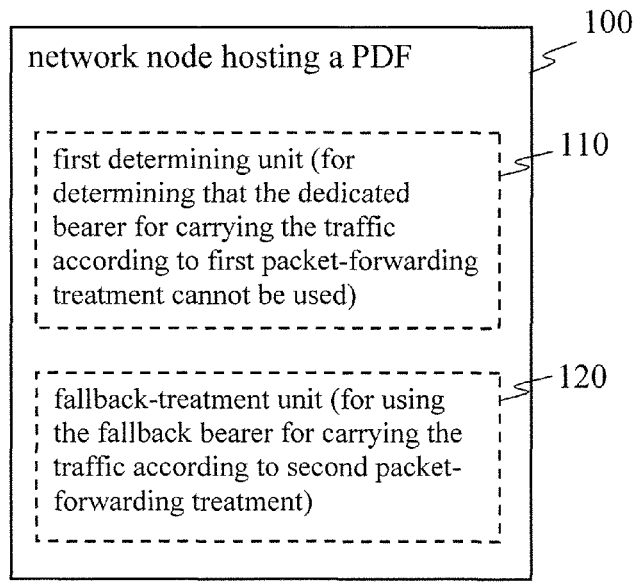

FIG. 20 schematically illustrates a network node 100 hosting a PDF, such as for example a PCRF, in one embodiment of the invention. The network node 100 illustrated on FIG. 20 may for example be implemented as illustrated on FIG. 19.

Network node 100 is configured for participating in providing, for a terminal device in a telecommunication network, a service or service component requiring a specific packet-forwarding treatment, i.e. a "first packet-forwarding treatment". Network node 100 comprises a so-called first determining unit 110 and a so-called fallback-treatment unit 120. First determining unit 110 is configured for, when the provision of the service or service component is sought to be initiated, or when the service or service component is already being provided, determining that a dedicated bearer for carrying the traffic associated with the service or service component requiring the first packet-forwarding treatment cannot be used. Fallback-treatment unit 120 is configured for participating in initiating the provision of the service or service component, or participating in carrying on the provision of the service or service component, using a bearer, hereinafter referred to as "fallback bearer", allowing the traffic associated with the service or service component to be carried with another packet-forwarding treatment, i.e. a "second packet-forwarding treatment". The first packet-forwarding treatment and the second packet-forwarding treatment are different.

In one embodiment, network node 100 is such that the fallback bearer is a default bearer. In another embodiment, network node 100 is such that the fallback bearer is a dedicated bearer.

In one embodiment, network node 100 is such that, for at least one packet-forwarding treatment property, the second packet-forwarding treatment is less demanding than the first packet-forwarding treatment.

In one embodiment, network node 100 is further configured for storing, while the fallback-treatment unit 120 is operating, information for identifying the first packet-forwarding treatment.

In one embodiment, network node 100 is further configured so that the fallback-treatment unit 120 is operating following a decision to bind flows of the traffic associated with the service or service component to the fallback bearer. The decision may be made after notifying a network node 200 hosting an AF and subject to receiving, from the network node 200 hosting the AF, an indication that it is acceptable to provide the service or service component with the second packet-forwarding treatment.

In one embodiment, network node 100 is such that the first determining unit 110 is configured for, when the service or service component is already being provided and when a handover of the terminal device from one radio access technology (RAT) to another RAT is being performed, determining that a dedicated bearer for carrying the traffic associated with the service or service component requiring the first packet-forwarding treatment cannot be used in the other RAT because the other RAT does not support dedicated bearers. The handover of the terminal device from the one RAT to the other RAT may for example be any one of a handover from a LTE RAT to an IEEE 802.11 WLAN RAT; a handover from a LTE RAT to an IEEE 802.16 WMAN RAT; and a handover from a LTE RAT to a 3GPP RAT which does not support dedicated bearers.

In one embodiment, network node 100 is such that the first determining unit 110 is configured for determining that a dedicated bearer for carrying the traffic associated with the service or service component requiring the first packet-forwarding treatment cannot be used because a network through which the traffic associated with the service or service component has to transit is congested.

In one embodiment, as schematically illustrated in FIG. 21, network node 100 further comprises a so-called second determining unit 130 and a so-called required-treatment unit 140. Second determining unit 130 is configured for, at a point in time after initiating the operation of the fallback-treatment unit 120, determining that a dedicated bearer for carrying the traffic associated with the service or service component requiring the first packet-forwarding treatment can be used at that point in time. Required-treatment unit 140 is configured for participating in carrying on the provision of the service or service component using a dedicated bearer allowing the traffic associated with the service or service component to be carried with the first packet-forwarding treatment.

In one embodiment, network node 100 is further configured so that the required-treatment unit 140 is operated following a decision to bind flows of the traffic associated with the service or service component to the dedicated bearer allowing the traffic associated with the service or service component to be carried with the first packet-forwarding treatment.

In one embodiment, network node 100 is such that second determining unit 130 is configured for, at a point in time after initiating the operation of the fallback-treatment unit 120 and when a handover of the terminal device from one RAT to another RAT is being performed, determining that a dedicated bearer for carrying the traffic associated with the service or service component requiring the first packet-forwarding treatment can be used in the other RAT. The handover of the terminal device from one RAT to another RAT may for example be any one of a handover from an IEEE 802.11 WLAN RAN to a LTE RAN; a handover from an IEEE 802.16 WMAN RAT to a LTE RAT; and a handover from a 3GPP RAT which does not support dedicated bearers to a LTE RAT.

In one embodiment, network node 100 is such that second determining unit 130 is configured for, at a point in time after initiating the operation of the fallback-treatment unit 120, determining that a dedicated bearer for carrying the traffic associated with the service or service component requiring the first packet-forwarding treatment can be used because a network through which the traffic associated with the service or service component has to transit has become less congested or has become uncongested, or because the terminal device has moved to a network which is less congested or is uncongested.

FIG. 22 schematically illustrates a network node 200 hosting an AF in one embodiment of the invention. The network node 200 illustrated on FIG. 22 may for example also be implemented as illustrated on FIG. 19.

Network node 200 is configured for participating in providing, for a terminal device in a telecommunication network, a service or service component requiring a specific packet-forwarding treatment, i.e. a "first packet-forwarding treatment". Network node 200 comprises a so-called receiving unit 212b, a so-called determining unit 213 and a so-called sending unit 214a. Receiving unit 212b is configured for receiving, from a network node 100 hosting a PDF, a notification that the network node 100 hosting the PDF intends to make a decision to apply, to the traffic associated with the service or service component, another packet-forwarding treatment, i.e. a "second packet-forwarding treatment", wherein the first packet-forwarding treatment and the second packet-forwarding treatment are different. Determining unit 213 is configured for determining that it is acceptable to provide the service or service component with the second packet-forwarding treatment. Sending unit 214a is then configured for sending, to the network node 100 hosting the PDF, an indication that it is acceptable to provide the service or service component with the second packet-forwarding treatment.

Where the terms "first determining unit", "fallback-treatment unit", "second determining unit", "required-treatment unit", "receiving unit", "determining unit", "sending unit", etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned first determining unit, fallback-treatment unit, second determining unit, required-treatment unit, receiving unit, determining unit, sending unit, etc. is replaced by first determining means, fallback-treatment providing means, second determining means, required-treatment providing means, receiving means, determining means, sending means, etc. respectively, or, first determining module, fallback-treatment providing module, second determining module, required-treatment providing module, receiving module, determining module, sending module, etc. for performing the functions of the first determining unit, fallback-treatment unit, second determining unit, required-treatment unit, receiving unit, determining unit, sending unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

ABBREVIATIONS

3GPP 3rd Generation Partnership Project
AAA Authentication & Authorization Answer (Diameter command)
AAR Authentication & Authorization Request (Diameter command)
AF Application function
ARP Allocation and retention priority
ASA Abort Session Answer (Diameter command)
ASR Abort Session Request (Diameter command)
AVP Attribute-value-pair
BBERF Bearer binding and event reporting function
BBF Bearer binding function
CCA Credit Control Answer (Diameter command)
CCR Credit Control Request (Diameter command)
CSCF Call Session Control Function
DL Downlink
E-UTRAN Evolved UMTS terrestrial radio access network
EDGE Enhanced Data Rates for GSM Evolution
GBR Guaranteed bit rate
GERAN GSM EDGE Radio Access Network
GGSN Gateway GPRS support node
GPRS General Packet Radio Service
GSM Global System for Mobile Communications
GTP GPRS tunneling protocol IM CN IP multimedia core network
IMS IP multimedia subsystem
IP Internet Protocol
IP-CAN IP Connectivity Access Network
LTE Long Term Evolution
MBR Maximum bit rate
MTV Mobile television
P2P Peer-to-peer
PCC Policy and charging control
PCEF Policy and charging enforcement function
PCRF Policy and charging rules function
PDF Policy decision function
PDN Packet data network
PDN-GW Packet data network gateway
PMIP Proxy Mobile Internet protocol
P-CSCF Proxy Call Session Control Function
QoS Quality of service
QCI QoS class identifier
RAA Re-Authorization Answer (Diameter command)
RAM Random-access memory
RAN Radio access network
RAR Re-Authorization Request (Diameter command)
RAT Radio Access Type
ROM Read-only memory
RTSP Real Time Streaming Protocol
SDF Service data flow
SIP Session Initiation Protocol
SPR Subscriber profile repository
STA Session Termination Answer (Diameter command)
STR Session Termination Request (Diameter command)
TDF Traffic detection function
UE User equipment
UL Uplink
UMTS Universal Mobile Telecommunications System
UTRAN UMTS Terrestrial Radio Access Network
VoIP Voice over IP

The invention claimed is:

1. A method, carried out by a network node hosting a policy decision function, for participating in providing, for a terminal device in a telecommunication network, one of a service and service component requiring a specific first packet-forwarding treatment, the method comprising:
a first determining procedure comprising determining that a dedicated bearer for carrying the traffic associated with the one of the service and service component requiring the first packet-forwarding treatment cannot be used, when one of:
the provision of the one of the service and service component is sought to be initiated; and
the one of the service and service component is already being provided; and
a fallback-treatment procedure comprising, after determining in the first determining procedure that the dedicated bearer cannot be used, participating in initiating the provision of one of the service and service component, participating in one of:
initiating the provision of the one of the service and service component; and
participating in carrying on the provision of the one of the service and service component; and
the fallback treatment procedure using a fallback bearer allowing the traffic associated with the one of the service and service component to be carried with a second packet-forwarding treatment, the first packet-forwarding treatment and the second packet-forwarding treatment being different, and the network node hosting a policy decision function being a network node hosting a policy and charging rules function.

2. The method of claim 1, wherein the fallback bearer is one of a default bearer and a dedicated bearer.

3. The method of claim 1, wherein, for at least one packet-forwarding treatment property, the second packet-forwarding treatment is less demanding than the first packet-forwarding treatment.

4. The method of claim 1, further comprising storing, while the fallback-treatment procedure is being executed, information for identifying the first packet-forwarding treatment.

5. The method claim 1, wherein the fallback-treatment procedure is carried out following a decision to bind flows of the traffic associated with the one of the service and service component to the fallback bearer.

6. The method of claim 5, wherein the decision is made after notifying a network node hosting an application function and subject to receiving, from the network node hosting the application function, an indication that it is acceptable to provide the one of the service and service component with the second packet-forwarding treatment.

7. The method of claim 1, wherein the first determining procedure comprises, when the one of the service and service component is already being provided and when a handover of the terminal device from one radio access technology to another radio access technology is being performed, determining that a dedicated bearer for carrying the traffic associated with the one of the service and service component requiring the first packet-forwarding treatment cannot be used in the other radio access technology because the other radio access technology does not support dedicated bearers.

8. The method of claim 7, wherein the handover of the terminal device from the one radio access technology to the other radio access technology is one of:
a handover from a long term evolution (LTE) radio access technology to an IEEE 802.11 wireless local area network radio access technology;
a handover from a LTE radio access technology to an IEEE 802.16 wireless metropolitan area network radio access technology; and
a handover from a LTE radio access technology to a 3GPP radio access technology which does not support dedicated bearers.

9. The method of claim 1, wherein the first determining procedure comprises determining that a dedicated bearer for carrying the traffic associated with the one of the service and service component requiring the first packet-forwarding treatment cannot be used because a network through which the traffic associated with the one of the service and service component has to transit is congested.

10. The method of claim 1, further comprising
a second determining procedure, comprising, at a point in time after initiating the fallback-treatment procedure, determining that a dedicated bearer for carrying the traffic associated with the one of the service and service component requiring the first packet-forwarding treatment can be used at that point in time; and
a required-treatment procedure, comprising participating in carrying on the provision of the one of the service and service component using a dedicated bearer allowing the traffic associated with the one of the service and service component to be carried with the first packet-forwarding treatment.

11. The method of claim 10, wherein the required-treatment procedure is carried out following a decision to bind flows of the traffic associated with the one of the service and service component to the dedicated bearer allowing the traffic associated with the one of the service and service component to be carried with the first packet-forwarding treatment.

12. The method of claim 10, wherein the second determining procedure comprises, at a point in time after initiating the fallback-treatment procedure and when a handover of the terminal device from one radio access technology to another radio access technology is being performed, determining that a dedicated bearer for carrying the traffic associated with the one of the service and service component requiring the first packet-forwarding treatment can be used in the other radio access technology.

13. The method of claim 12, wherein the handover of the terminal device from one radio access technology to another radio access technology is one of:
  a handover from an IEEE 802.11 wireless local area network radio access technology to a long term evolution (LTE) radio access technology;
  a handover from an IEEE 802.16 wireless metropolitan area network radio access technology to a LTE radio access technology; and
  a handover from a 3GPP radio access technology which does not support dedicated bearers to a LTE radio access technology.

14. The method of claim 10, wherein the second determining procedure comprises, at a point in time after initiating the fallback-treatment procedure, determining that a dedicated bearer for carrying the traffic associated with the one of the service and service component requiring the first packet-forwarding treatment can be used because one of:
  a network through which the traffic associated with the one of the service and service component has to transit has become one of less congested and uncongested; and
  the terminal device has moved to a network which is one of less congested and uncongested.

15. A method, carried out by a network node hosting an application function, for participating in providing, for a terminal device in a telecommunication network, one of a service and service component requiring a specific first packet-forwarding treatment, the method comprising:
  receiving, from a network node hosting a policy decision function, a notification that the network node hosting the policy decision function intends to make a decision to apply, to the traffic associated with the one of the service and service component, a second packet-forwarding treatment, the first packet-forwarding treatment and the second packet-forwarding treatment being different;
  determining that it is acceptable to provide the one of the service and service component with the second packet-forwarding treatment; and
  sending, to the network node hosting the policy decision function, an indication that it is acceptable to provide the one of the service and service component with the second packet-forwarding treatment, the network node hosting the policy decision function being a network node hosting a policy and charging rules function.

16. A network node hosting a policy decision function, for participating in providing, for a terminal device in a telecommunication network, one of a service and service component requiring a specific first packet-forwarding treatment, the network node:
  configured for a first determining procedure comprising determining that a dedicated bearer for carrying the traffic associated with the one of the service and service component requiring the first packet-forwarding treatment cannot be used, when one of:
    the provision of the one of the service and service component is sought to be initiated; and
    the one of the service and service component is already being provided; and
  configured for a fallback-treatment procedure comprising, after determining that the dedicated bearer cannot be used, participating in one of:
    initiating the provision of the one of the service and service component; and
    participating in carrying on the provision of the one of the service and service component, using a fallback bearer allowing the traffic associated with the one of the service and service component to be carried with a second packet-forwarding treatment, the first packet-forwarding treatment and the second packet-forwarding treatment being different, and the network node hosting a policy decision function being a network node hosting a policy and charging rules function.

17. The network node of claim 16, wherein the fallback bearer is any one of a default bearer and a dedicated bearer.

18. The network node of claim 16, wherein, for at least one packet-forwarding treatment property, the second packet-forwarding treatment is less demanding than the first packet-forwarding treatment.

19. The network node of claim 16, the network node being further configured for storing, while the fallback-treatment procedure is operating, information for identifying the first packet-forwarding treatment.

20. The network node of claim 16, the network node being further configured so that the fallback-treatment procedure is carried out following a decision to bind flows of the traffic associated with the one of the service and service component to the fallback bearer.

21. The network node of claim 20, the network node being further configured so that the decision is made after notifying a network node hosting an application function and subject to receiving, from the network node hosting the application function, an indication that it is acceptable to provide the one of the service and service component with the second packet-forwarding treatment.

22. The network node of claim 16, wherein the first determining procedure comprises, when the one of the service and service component is already being provided and when a handover of the terminal device from one radio access technology to another radio access technology is being performed, determining that a dedicated bearer for carrying the traffic associated with the one of the service and service component requiring the first packet-forwarding treatment cannot be used in the other radio access technology because the other radio access technology does not support dedicated bearers.

23. The network node of claim 22, wherein the handover of the terminal device from the one radio access technology to the other radio access technology is any one of:
  a handover from a long term evolution (LTE) radio access technology to an IEEE 802.11 wireless local area network radio access technology;
  a handover from a LTE radio access technology to an IEEE 802.16 wireless metropolitan area network radio access technology; and
  a handover from a LTE radio access technology to a 3GPP radio access technology which does not support dedicated bearers.

24. The network node of claim 16, wherein the first determining procedure comprises determining that a dedicated bearer for carrying the traffic associated with the one of the service and service component requiring the first packet-forwarding treatment cannot be used because a network through which the traffic associated with the one of the service and service component has to transit is congested.

25. The network node of claim 16, the network node is further configured for:
   a second determining procedure comprising, at a point in time after initiating the operation of the fallback-treatment procedure, determining that a dedicated bearer for carrying the traffic associated with the one of the service and service component requiring the first packet-forwarding treatment can be used at that point in time; and
   a required-treatment procedure comprising participating in carrying on the provision of the one of the service and service component using a dedicated bearer allowing the traffic associated with the one of the service and service component to be carried with the first packet-forwarding treatment.

26. The network node of claim 25, the network node being further configured so that the required-treatment procedure is operated following a decision to bind flows of the traffic associated with the one of the service and service component to the dedicated bearer allowing the traffic associated with the one of the service and service component to be carried with the first packet-forwarding treatment.

27. The network node of claim 25, wherein the second determining procedure comprises, at a point in time after initiating the operation of the fallback-treatment procedure and when a handover of the terminal device from one radio access technology to another radio access technology is being performed, determining that a dedicated bearer for carrying the traffic associated with the one of the service and service component requiring the first packet-forwarding treatment can be used in the other radio access technology.

28. The network node of claim 27, wherein the handover of the terminal device from one radio access technology to another radio access technology is any one of:
   a handover from an IEEE 802.11 wireless local area network radio access technology to a long term evolution (LTE) radio access technology;
   a handover from an IEEE 802.16 wireless metropolitan area network radio access technology to a LTE radio access technology; and
   a handover from a 3GPP radio access technology which does not support dedicated bearers to a LTE radio access technology.

29. The network node claim 25, wherein the second determining procedure comprises, at a point in time after initiating the operation of the fallback-treatment procedure, determining that a dedicated bearer for carrying the traffic associated with the one of the service and service component requiring the first packet-forwarding treatment can be used because one of:
   a network through which the traffic associated with the one of the service and service component has to transit has become one of less congested and has become uncongested; and
   the terminal device has moved to a network which is less congested or is uncongested.

30. A network node hosting an application function, for participating in providing, for a terminal device in a telecommunication network, one of a service and service component requiring a specific first packet-forwarding treatment, the network node:
   configured for receiving, from a network node hosting a policy decision function, a notification that the network node hosting the policy decision function intends to make a decision to apply, to the traffic associated with the one of the service and service component, a second packet-forwarding treatment, the first packet-forwarding treatment and the second packet-forwarding treatment being different;
   configured for determining that it is acceptable to provide the one of the service and service component with the second packet-forwarding treatment; and
   configured for sending, to the network node hosting the policy decision function, an indication that it is acceptable to provide the one of the service and service component with the second packet-forwarding treatment, the network node hosting the policy decision function being a network node hosting a policy and charging rules function.

31. A non-transitory computer storage medium storing a computer program, that when executed by a processor of a network node hosting a policy decision function, for participating in providing, for a terminal device in a telecommunication network, one of a service and service component requiring a specific first packet-forwarding treatment performs a method, the method comprising:
   a first determining procedure comprising determining that a dedicated bearer for carrying the traffic associated with the one of the service and service component requiring the first packet-forwarding treatment cannot be used, when one of:
      the provision of the one of the service and service component is sought to be initiated; and
      the one of the service and service component is already being provided; and
   a fallback-treatment procedure comprising, after determining in the first determining procedure that the dedicated bearer cannot be used, participating in initiating the provision of one of the service and service component, participating in one of:
      initiating the provision of the one of the service and service component; and
      participating in carrying on the provision of the one of the service and service component; and
   the fallback treatment procedure using a fallback allowing the traffic associated with the one of the service and service component to be carried with a second packet-forwarding treatment, the first packet-forwarding treatment and the second packet-forwarding treatment being different, and the network node hosting a policy decision function being a network node hosting a policy and charging rules function.

32. A non-transitory computer storage medium storing a computer program, that when executed by a processor of a network node hosting an application function, for participating in providing, for a terminal device in a telecommunication network, one of a service and service component requiring a specific first packet-forwarding treatment performs a method, the method comprising:
   receiving, from a network node hosting a policy decision function, a notification that the network node hosting the policy decision function intends to make a decision to apply, to the traffic associated with the one of the service and service component, a second packet-forwarding treatment, the first packet-forwarding treatment and the second packet-forwarding treatment being different;
determining that it is acceptable to provide the one of the service and service component with the second packet-forwarding treatment; and
sending, to the network node hosting the policy decision function, an indication that it is acceptable to provide the one of the service and service component with the second packet-forwarding treatment, the network node hosting the policy decision function being a network node hosting a policy and charging rules function.

* * * * *